United States Patent
Sakayori et al.

(10) Patent No.: US 12,110,072 B2
(45) Date of Patent: Oct. 8, 2024

(54) STEERING CONTROL DEVICE

(71) Applicant: Hitachi Astemo, Ltd., Hitachinaka (JP)

(72) Inventors: Go Sakayori, Tokyo (JP); Kenta Maeda, Tokyo (JP); Tomoaki Fujibayashi, Hitachinaka (JP); Hiroki Sonoda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 216 days.

(21) Appl. No.: 17/791,250

(22) PCT Filed: Dec. 8, 2020

(86) PCT No.: PCT/JP2020/045708
§ 371 (c)(1),
(2) Date: Jul. 7, 2022

(87) PCT Pub. No.: WO2021/149381
PCT Pub. Date: Jul. 29, 2021

(65) Prior Publication Data
US 2023/0347972 A1    Nov. 2, 2023

(30) Foreign Application Priority Data

Jan. 24, 2020 (JP) .................. 2020-009880

(51) Int. Cl.
    B62D 6/00 (2006.01)
(52) U.S. Cl.
    CPC .................. B62D 6/008 (2013.01)
(58) Field of Classification Search
    CPC .................. B62D 6/008
    See application file for complete search history.

(56) References Cited

U.S. PATENT DOCUMENTS

2003/0220727 A1* 11/2003 Husain .................. B62D 6/008
                                                    180/443
2004/0148078 A1   7/2004 Nakano et al.
2005/0067213 A1   3/2005 Yasui et al.
(Continued)

FOREIGN PATENT DOCUMENTS

JP        64-74168 A      3/1989
JP      2003-160042 A     6/2003
(Continued)

OTHER PUBLICATIONS

Sai (Year: 2010).*
(Continued)

*Primary Examiner* — George C Jin
(74) *Attorney, Agent, or Firm* — Crowell & Moring LLP

(57) ABSTRACT

The present disclosure provides a steering control device capable of transmitting an appropriate reaction force by a driver via a steering wheel and improving the stability of a vehicle. Provided is a steering control device 100 for controlling a reaction force actuator 16 that generates a reaction force against an operation of a driver in a steering wheel 13 of a vehicle 10. The steering control device 100 increases the reaction force in a nonlinear region where a cornering force characteristic that is the relationship between the slip angle and the lateral force of tires 11 of the vehicle 10 becomes nonlinear, more than the reaction force in a linear region where the cornering force characteristic becomes linear.

11 Claims, 15 Drawing Sheets

(56) References Cited

U.S. PATENT DOCUMENTS

| | | | |
|---|---|---|---|
| 2014/0316658 A1* | 10/2014 | Chai | B62D 6/04 |
| | | | 701/42 |
| 2019/0031231 A1* | 1/2019 | George | B62D 5/0463 |
| 2019/0047616 A1* | 2/2019 | Lesbirel | B62D 15/029 |
| 2020/0017139 A1* | 1/2020 | Ramanujam | B62D 5/0481 |
| 2020/0262468 A1* | 8/2020 | George | B60W 50/16 |

FOREIGN PATENT DOCUMENTS

| | | | |
|---|---|---|---|
| JP | 2004-155282 A | | 6/2004 |
| JP | 2005-96672 A | | 4/2005 |
| JP | 2006-151134 A | | 6/2006 |
| JP | 2010132205 A | * | 6/2010 |
| JP | 2012-232704 A | | 11/2012 |
| JP | 2016-2884 A | | 1/2016 |

OTHER PUBLICATIONS

International Search Report (PCT/ISA/210) issued in PCT Application No. PCT/JP2020/045708 dated Feb. 9, 2021 with English translation (seven (7) pages).
Japanese-language Written Opinion (PCT/ISA/237) issued in PCT Application No. PCT/JP2020/045708 dated Feb. 9, 2021 (four (4) pages).
Chinese-language Office Action issued in Chinese Application No. 202080091393.5 dated Apr. 14, 2023 with English translation (20 pages).

* cited by examiner

STEERING CONTROL DEVICE

TECHNICAL FIELD

The present disclosure relates to a steering control device.

BACKGROUND ART

An invention relating to a steering device for a vehicle such as a steer-by-wire (SBW) system that can apply a force from an actuator to an operating member such as a steering wheel has been known from the past (see Patent Literature 1 below). An object of the invention described in Patent Literature 1 is to provide a steering device for a vehicle capable of appropriately transmitting necessary information to a driver, thereby providing a comfortable driving environment (Ibid, Paragraph 0008).

In order to achieve the above object, Patent Literature 1 discloses a steering device for a vehicle for operating a steering mechanism for turning a steered wheel in accordance with the operation of an operating member operated by a driver (Ibid, claim 1, Paragraph 0009). This conventional steering device for a vehicle includes an actuator, at least one sensor, signal analysis means, and control means. The actuator applies a force to the operating member to transmit information to the driver. The at least one sensor detects a physical quantity relating to the motion of the vehicle and outputs a detection signal corresponding to the detection result. The signal analysis means analyzes the detection signal output from the sensor and outputs an analysis result. The control means controls the actuator on the basis of the analysis result output from the signal analysis means.

According to this configuration, the detection result of the sensor for detecting the physical quantity (including the operation of the operating member, the operation of the steering mechanism, the operation of a braking mechanism, the operation of a driving system, the load on tires, and the like) relating to the motion of the vehicle is analyzed, and the actuator is controlled on the basis of the analysis result (Ibid, Paragraph 0010). More specifically, for example, a larger reaction force is transmitted to the driver via the steering wheel as the speed or acceleration of change of the load applied to the tires increases, and a larger reaction force is transmitted to the driver via the steering wheel as the vehicle speed increases (Ibid, Paragraph 0028).

CITATION LIST

Patent Literature

Patent Literature 1: Japanese Unexamined Patent Application Publication No. 2004-155282

SUMMARY OF INVENTION

Technical Problem

In the above-described conventional steering device for a vehicle, the speed or acceleration of change of the load applied to the tires becomes smaller in a slip area where the tires of the vehicle slip on the road surface than in an adhesive area where no slip occurs. As a result, there is a risk that the reaction force transmitted to the driver via the steering wheel is decreased, the steering operation by the driver becomes excessive, and the stability of the vehicle is lowered.

The present disclosure provides a steering control device capable of transmitting an appropriate reaction force by a driver via a steering wheel and improving the stability of a vehicle.

Solution to Problem

According to one aspect of the present disclosure, provided is a steering control device for controlling a reaction force actuator that generates a reaction force against an operation of a driver in a steering wheel of a vehicle, wherein the reaction force in a nonlinear region where a cornering force characteristic that is the relationship between the slip angle and the lateral force of tires of the vehicle becomes nonlinear is increased more than that in a linear region where the cornering force characteristic becomes linear.

Advantageous Effects of Invention

According to the above-described aspect of the present disclosure, it is possible to provide a steering control device capable of transmitting an appropriate reaction force by a driver via a steering wheel and improving the stability of a vehicle.

DESCRIPTION OF EMBODIMENTS

Hereinafter, embodiments of a steering control device according to the present disclosure will be described with reference to the drawings.

First Embodiment

Figure 1:
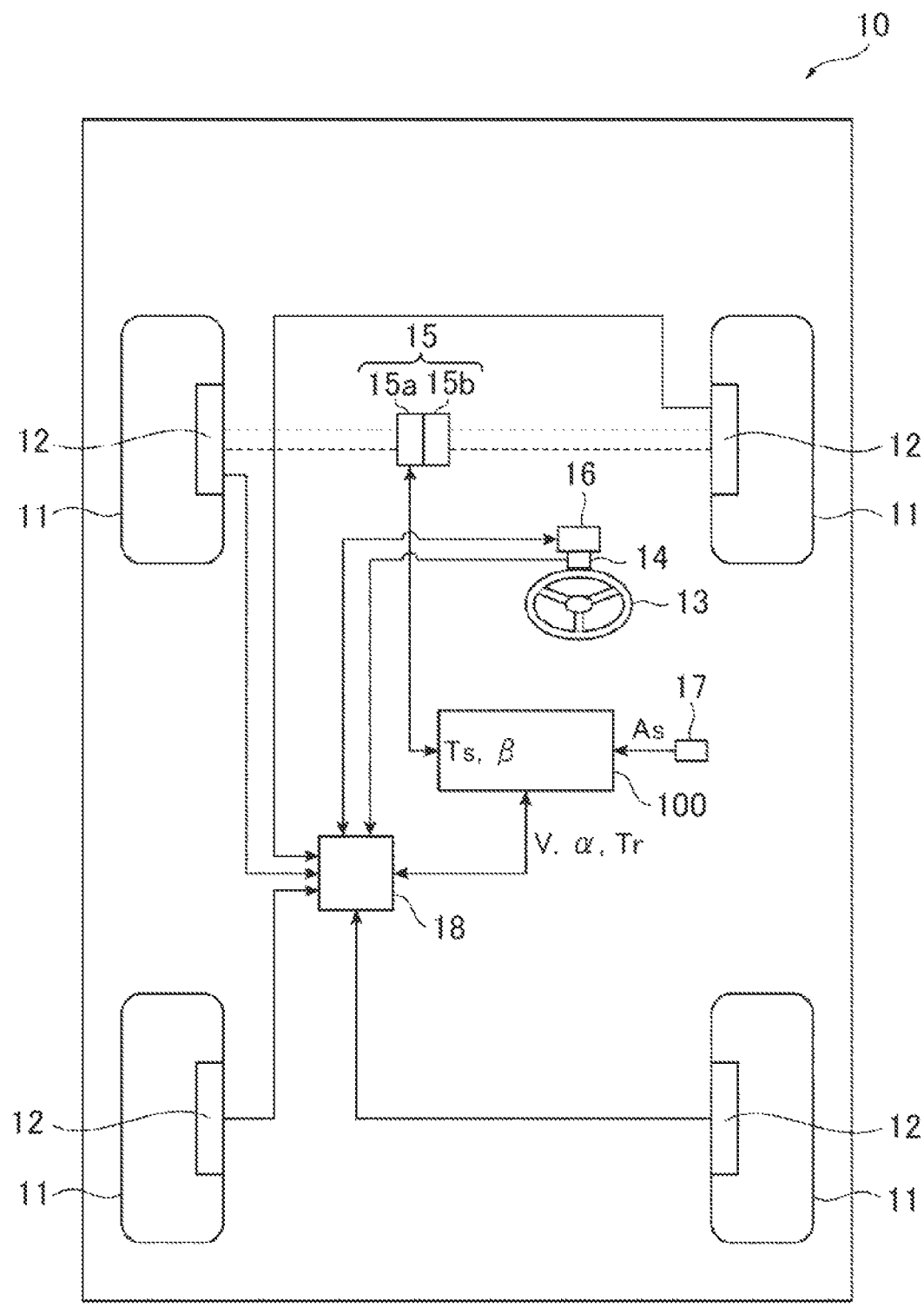
FIG. 1 is a schematic configuration diagram for showing a first embodiment of a steering control device according to the present disclosure.

FIG. 1 is a schematic configuration diagram for showing a first embodiment of a steering control device according to the present disclosure. A steering control device 100 of the embodiment is, for example, a microcontroller mounted on a vehicle 10, and controls a reaction force actuator 16 that generates a reaction force in the direction opposite to the operating direction by the driver in a steering wheel 13.

In the example shown in FIG. 1, the vehicle 10 includes, for example, tires 11, speed sensors 12, the steering wheel 13, a steering angle sensor 14, a turning mechanism 15, the reaction force actuator 16, an acceleration sensor 17, a communication bus line 18, and the steering control device 100. The tires 11 are, for example, steered wheels the left and right front wheels of which are turned by the turning mechanism 15, and are driving wheels the left and right rear wheels of which are coupled to a power source such as an engine or a motor (not shown in the drawing) of the vehicle 10 via a power transmission mechanism.

The speed sensors 12 detect the speed and the yaw rate of the vehicle 10 on the basis of, for example, the rotational speed of each tire 11. The steering wheel 13 is operated by the driver of the vehicle 10. For example, a steer-by-wire system is mounted on the vehicle 10. That is, the steering wheel 13 is configured to be capable of, for example, switching between a state in which the steering wheel 13 is not mechanically coupled to the tires 11 that are steered wheels or mechanically coupled and a state in which the mechanical coupling is released.

The steering angle sensor 14 detects the steering angle α and the steering angular speed of the steering wheel 13 operated by the driver of the vehicle 10. The turning mechanism 15 is configured using, for example, a turning actuator 15a for turning the tires 11 that are steered wheels and a turning angle control unit 15b for controlling the turning angle β of the tires 11 by the turning actuator 15a.

The reaction force actuator 16 generates a reaction force against the operation of the driver of the vehicle 10 in the steering wheel 13. The acceleration sensor 17 detects acceleration in the longitudinal direction of the vehicle 10 and lateral acceleration As that is acceleration in the lateral direction of the vehicle 10. In addition, the acceleration sensor 17 may be an inertial sensor for detecting the acceleration and the attitude angle of the vehicle 10.

The steering control device 100 is connected to the speed sensors 12, the steering angle sensor 14, and the reaction force actuator 16 via the communication bus line 18. The steering control device 100 acquires the speed V and the yaw rate of the vehicle 10, the steering angle α of the steering wheel 13, torque Tr as the reaction force generated by the reaction force actuator 16, and the like via the communication bus line 18. In addition, the steering control device 100 acquires acceleration including the lateral acceleration As of the vehicle 10 from the acceleration sensor 17. In addition, the steering control device 100 acquires turning torque Ts for turning the tires 11 that are steered wheels and the turning angle β of the tires 11 from the turning mechanism 15.

Figure 2:
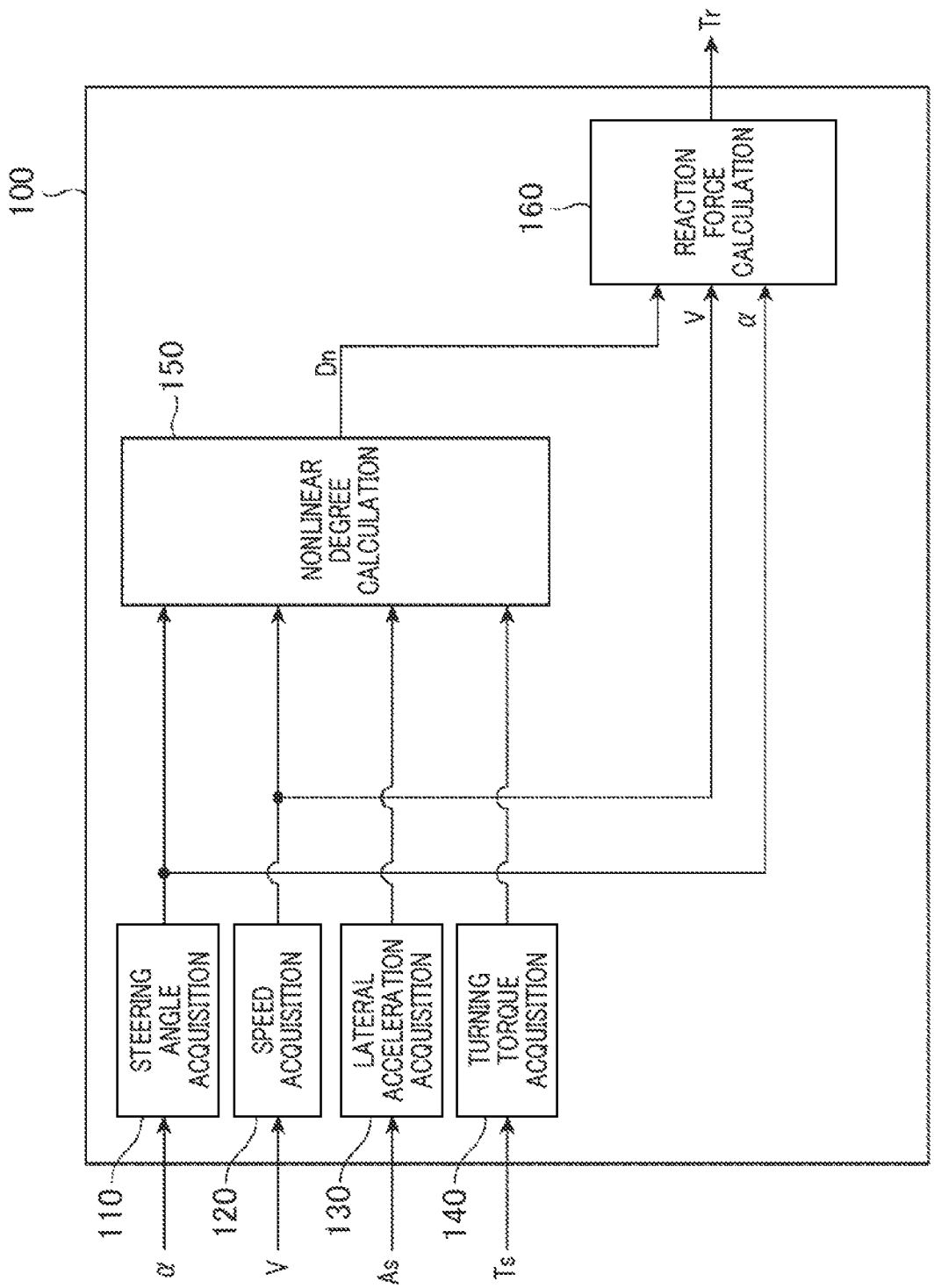
FIG. 2 is a functional block diagram of the steering control device shown in FIG. 1.

FIG. 2 is a functional block diagram of the steering control device 100 shown in FIG. 1. The steering control device 100 is, for example, an electronic control device or a part thereof configured using a microcontroller including an arithmetic device such as a central processing unit (CPU) (not shown in the drawing), a main storage device, an auxiliary storage device, an input/output device, a timer, and the like.

The steering control device 100 includes, for example, a steering angle acquisition function 110, a speed acquisition function 120, a lateral acceleration acquisition function 130, a turning torque acquisition function 140, a nonlinear degree calculation function 150, and a reaction force calculation function 160. Each of these functions of the steering control device 100 can be realized, for example, by periodically executing a program loaded in the main storage device by the arithmetic device while referring to a database stored in the auxiliary storage device in the steering control device 100.

The steering angle acquisition function 110 acquires the steering angle α of the steering wheel 13 by the driver from the steering angle sensor 14. The speed acquisition function 120 acquires the speed V of the vehicle 10 from the speed sensors 12. In addition, the speed acquisition function 120 may calculate the speed V of the vehicle 10 from the integrated value of the acceleration in the longitudinal direction of the vehicle 10 acquired from the acceleration sensor 17. The lateral acceleration acquisition function 130 acquires the lateral acceleration As of the vehicle 10 from the acceleration sensor 17. The turning torque acquisition function 140 acquires the turning torque Tr of the tires 11 from the turning mechanism 15. In addition, the steering angle acquisition function 110, the speed acquisition function 120, the lateral acceleration acquisition function 130, and the turning torque acquisition function 140 may filter a signal of each of the acquired information to remove noise and disturbance and improve the reliability of each of the acquired information.

The nonlinear degree calculation function 150 calculates the nonlinear degree Dn of a cornering force characteristic. Here, the cornering force characteristic is the relationship between the slip angle and the lateral force of the tires 11 of the vehicle 10. Although the details will be described later, the nonlinear degree calculation function 150 in the steering control device 100 of the embodiment calculates the nonlinear degree Dn of the cornering force characteristic on the basis of the relationship between the lateral acceleration As and the turning torque Ts.

The reaction force calculation function 160 inputs the steering angle α acquired by the steering angle acquisition function 110, the speed V of the vehicle 10 acquired by the speed acquisition function 120, and the nonlinear degree Dn of the cornering force characteristic calculated by the nonlinear degree calculation function 150. The reaction force calculation function 160 calculates a command value of the torque Tr as the reaction force generated by the reaction force actuator 16 on the basis of the steering angle α, the speed V, and the nonlinear degree Dn.

The reaction force calculation function 160 outputs the calculated command value of the torque Tr as the reaction force to the reaction force actuator 16 via, for example, the communication bus line 18. The reaction force actuator 16 generates, for example, the torque Tr as the reaction force against the operation of the steering wheel 13 by the driver in accordance with the command value of the torque Tr input via the communication bus line 18.

Figure 3:
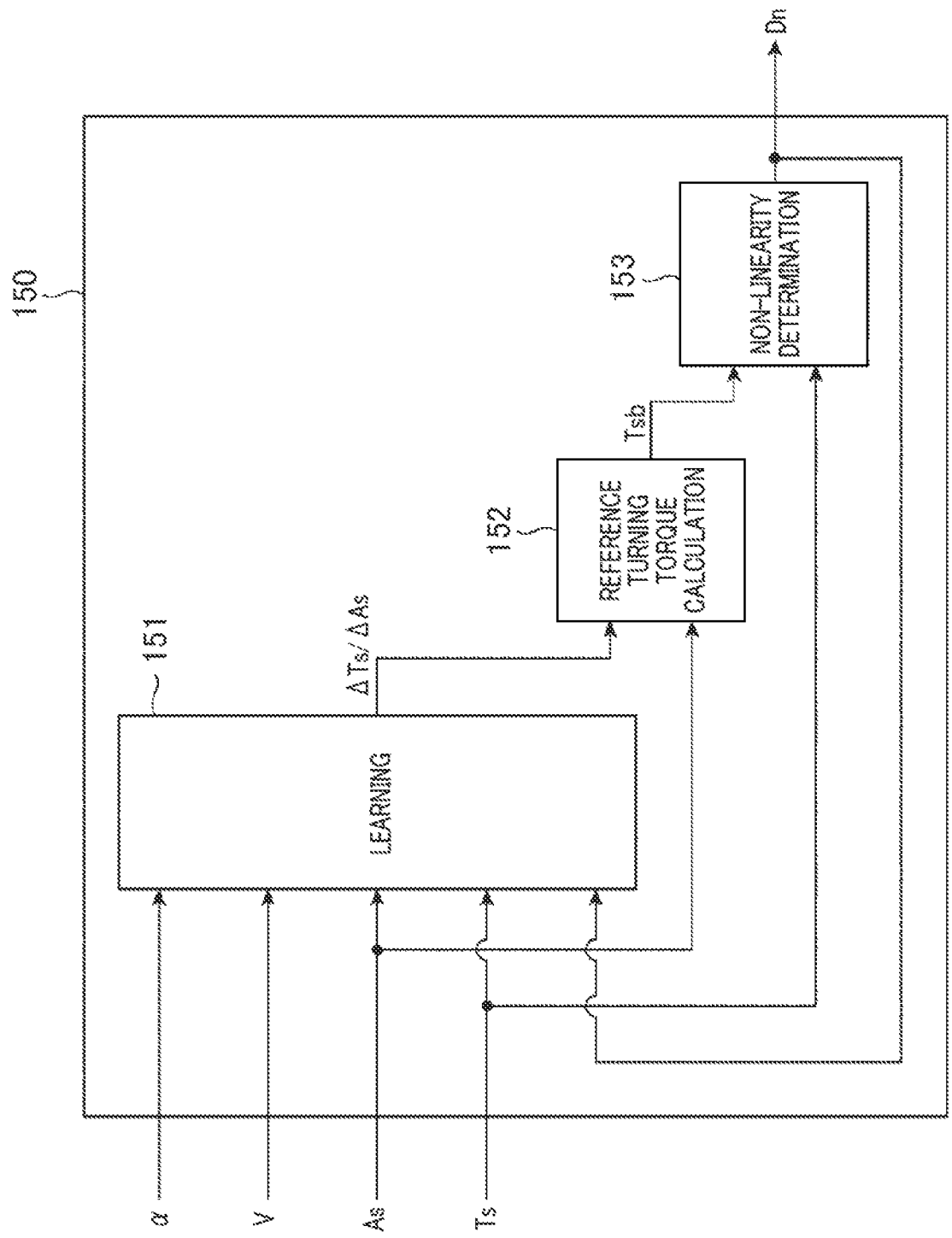
FIG. 3 is a functional block diagram for showing details of a nonlinear degree calculation function of FIG. 2.
Figure 4:
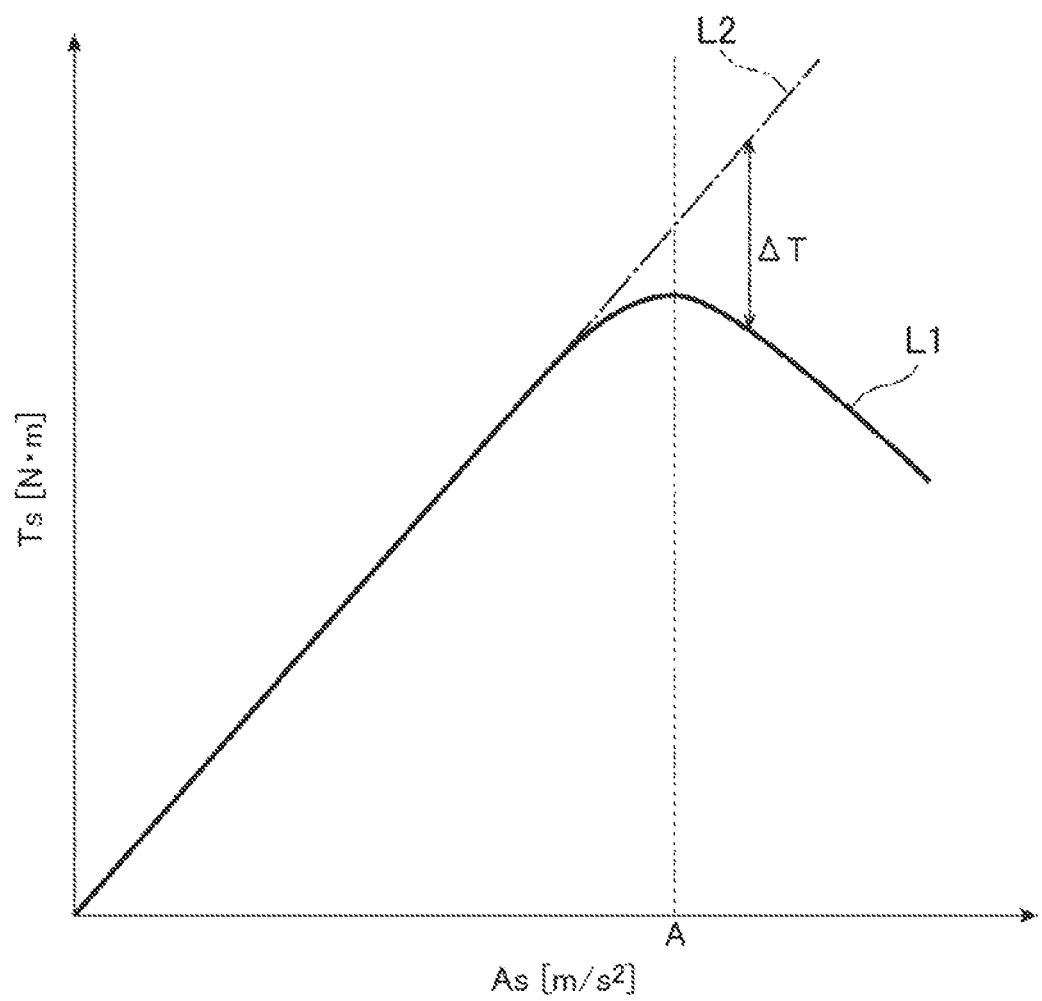
FIG. 4 is a graph for showing an example of the relationship between the lateral acceleration of a vehicle and turning torque.

FIG. 3 is a functional block diagram for showing details of the nonlinear degree calculation function 150 of FIG. 2. FIG. 4 is a graph for showing an example of the relationship between the lateral acceleration As of the vehicle 10 and the turning torque Ts. The nonlinear degree calculation function 150 has, for example, a learning function 151, a reference turning torque calculation function 152, and a non-linearity determination function 153.

The learning function 151 learns the relationship between the lateral acceleration As and the turning torque Ts. More specifically, the learning function 151 inputs, for example, the steering angle α, the speed V, the lateral acceleration As, and the turning torque Ts of the vehicle 10, and the nonlinear degree Dn of the cornering force characteristic of the vehicle 10 calculated in the previous arithmetic period. On the basis of these inputs, the learning function 151 outputs the rate of change (ΔTs/ΔAs) obtained by dividing the increased amount ΔTs of the turning torque Ts by the increased amount ΔAs of the lateral acceleration As, that is, the inclination of the straight line portion of the relationship between the lateral acceleration As and the turning torque Ts shown by the solid line L1 in FIG. 4.

As shown in FIG. 4, the relationship between the lateral acceleration As of the vehicle 10 and the turning torque Ts becomes linear, as similar to the cornering force characteristic, in the linear region where the cornering force characteristic that is the relationship between the slip angle and the lateral force of the tires 11 of the vehicle 10 becomes linear. It should be noted that the turning torque Ts is the output torque of the turning actuator 15a. In addition, the relationship between the lateral acceleration As of the vehicle 10 and the turning torque Ts becomes nonlinear, as similar to the cornering force characteristic, in the nonlinear region where the cornering force characteristic becomes nonlinear.

The linear region where the cornering force characteristic becomes linear corresponds to a state before the lateral force of the tires 11 is saturated. The nonlinear region where the cornering force characteristic becomes nonlinear corresponds to a state where the lateral force of the tires 11 is saturated. In the example shown in FIG. 4, when the lateral acceleration As exceeds a predetermined value A, the turning torque Ts changes from an increase to a decrease. This region is assumed to be the nonlinear region where the lateral force of the tires 11 is saturated. By focusing on such a relationship between the lateral acceleration As and the turning torque Ts, the learning function 151 learns the relationship between the input lateral acceleration As and turning torque Ts.

In addition, when the vertical load acting on the tires 11 is changed by an acceleration/deceleration operation based on the operation of the accelerator or the brake of the vehicle 10, the cornering force and the cornering power of the tires 11 are also changed. Further, when the friction coefficient of the road surface changes, the cornering force characteristic of the tires 11 also changes. As described above, when the cornering force or the cornering power of the tires 11 changes, it is conceivable that the value A of the lateral acceleration As at which the turning torque Ts changes from an increase to a decrease also change as shown in FIG. 4.

Thus, the learning function 151 learns the rate of change (ΔTs/ΔAs) of the turning torque Ts and the lateral acceleration As by using, for example, the steering angle α, the speed V, the lateral acceleration As, the turning torque Ts, and the determination result as the linear region or the nonlinear region as inputs. More specifically, the learning function 151 learns the inclination of the straight line portion in the graph of FIG. 4 only in the case where, for example, the lateral acceleration As is equal to or larger than a predetermined threshold value and the speed V of the vehicle 10 is equal to or larger than the predetermined threshold value, and the case of the linear region where the cornering force characteristic becomes linear.

Figure 5:
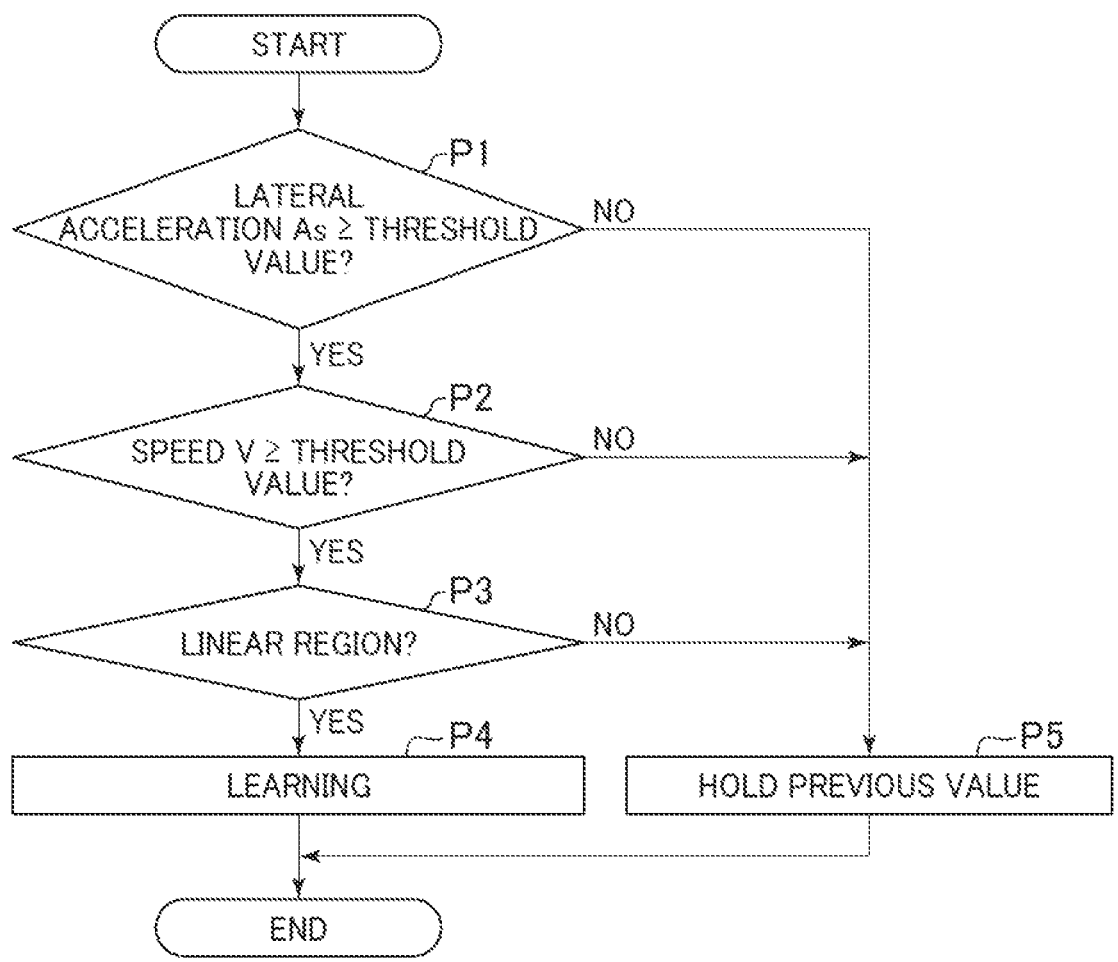
FIG. 5 is a flowchart for showing an example of the operation of a learning function of FIG. 3.

Hereinafter, an example of the operation of the learning function 151 will be described with reference to FIG. 5. FIG. 5 is a flowchart for showing an example of the operation of the learning function 151 of FIG. 3. The learning function 151 repeatedly executes each process from the start to the end shown in FIG. 5 in a predetermined period. When the process shown in FIG. 5 is started, the learning function 151 first executes a determination process P1 for determining whether or not the lateral acceleration As of the vehicle 10 is equal to or larger than a predetermined threshold value.

If it is determined in the determination process P1 that the lateral acceleration As of the vehicle 10 is equal to or larger than the predetermined threshold value (YES), the learning function 151 executes the next determination process P2. In addition, if it is determined in the determination process P1 that the lateral acceleration As is smaller than the predetermined threshold value (NO), the learning function 151 executes a process P5 for holding the inclination learned up to the previous process, that is, the rate of change (ΔTs/ΔAs) of the turning torque Ts and the lateral acceleration As. Thereafter, the learning function 151 terminates the process shown in FIG. 5.

That is, the learning function 151 does not execute a learning process P4 in the case where the lateral acceleration As of the vehicle 10 is smaller than the predetermined threshold value. Accordingly, it is possible to prevent the learning process P4 from being performed for the minute steering of the driver when the steering wheel 13 is positioned at the neutral point corresponding to the straight traveling, and to prevent the rate of change (ΔTs/ΔAs) of the turning torque Ts and the lateral acceleration As from being learned during the straight traveling of the vehicle 10.

In the next determination process P2, the learning function 151 determines whether or not the speed V of the vehicle 10 is equal to or larger than the threshold value. If it is determined in the determination process P2 that the speed V of the vehicle 10 is equal to or larger than the threshold value (YES), the learning function 151 executes the next determination process P3. In addition, if it is determined in the determination process P2 that the speed V of the vehicle 10 is smaller than the predetermined threshold value (NO), the learning function 151 executes the process P5 for holding the rate of change (ΔTs/ΔAs) of the turning torque Ts and the lateral acceleration As learned up to the previous process. Thereafter, the learning function 151 terminates the process shown in FIG. 5.

That is, the learning function 151 does not execute the learning process P4 in the case where the speed V of the vehicle 10 is smaller than the predetermined threshold value. Accordingly, it is possible to prevent the rate of change (ΔTs/ΔAs) of the turning torque Ts and the lateral acceleration As from being learned during the stopping, slow traveling, or creep traveling at, for example, 5 [km/h] or less of the vehicle 10. Accordingly, for example, it is possible to prevent noisy data from being learned.

In the next determination process P3, the learning function 151 determines whether or not the cornering force characteristic of the tires 11 of the vehicle 10 is in a linear region. The learning function 151 determines whether or not the cornering force characteristic of the tires 11 of the vehicle 10 is in a linear region on the basis of the determination result of whether or not the cornering force characteristic is in a linear region as an output of the non-linearity determination function 153 or the nonlinear degree of the cornering force characteristic to be described later.

If it is determined in the determination process P3 that the cornering force characteristic of the tires 11 of the vehicle 10 is in a linear region (YES), the learning function 151 executes the next learning process P4. In addition, if it is determined in the determination process P3 that the cornering force characteristic is in a nonlinear region (NO), the learning function 151 executes the process P5 for holding the rate of change (ΔTs/ΔAs) of the turning torque Ts and the lateral acceleration As learned up to the previous process. Thereafter, the learning function 151 terminates the process shown in FIG. 5.

That is, the learning function 151 does not execute the learning process P4 in the case where the cornering force characteristic is in a nonlinear region. Accordingly, it is possible to prevent the relationship between the turning torque Ts and the lateral acceleration As that becomes nonlinear in the nonlinear region of the cornering force characteristic from being learned.

In addition, in the case where the relationship between the lateral acceleration As and the turning torque Ts changes due to, for example, a change in the vertical load on the tires 11 or a change in the friction coefficient of the road surface, it is conceivable that the dispersion at the time of learning increases. Therefore, it is not necessary for the learning function 151 to execute the learning process P4 in the case where the dispersion is equal to or larger than a predetermined value. In addition, the learning function 151 may erase the learned value and perform the learning process P4 again in the case where the state where the dispersion is equal to or larger than the predetermined value continues for a predetermined period. The learning process P4 may include these processes.

In the learning process P4, the learning function 151 sequentially calculates and updates the rate of change (ΔTs/ΔAs) of the turning torque Ts and the lateral acceleration As, that is, the inclination of the straight line portion of the solid line L1 shown in FIG. 4 on the basis of the input lateral acceleration As and turning torque Ts.

As an example of a method for sequentially obtaining the inclination, a sequential least squares method can be employed. More specifically, a case where the inclination of a straight line L2 near the origin is estimated from the time-series data of the lateral acceleration As and the turning torque Ts as shown in FIG. 4 is assumed. In this case, for example, in order to estimate θ from an input ζ and an output y of data having the relationship y=θ·ζ, the following equations (1) and (2) may be sequentially calculated in a certain sample k.
(Source: http://fujilab.k.u-tokyo.ac.jp/papers/2008/kanouSICE08.pdf, page 4)

[Equation 1]

$$\Gamma(k) = \frac{1}{\lambda^*}\left[\Gamma(k-1) - \frac{\Gamma(k-1)\zeta^2(k)\Gamma(k-1)}{\lambda^* + \zeta(k)\Gamma(k-1)\zeta}\right] \quad (1)$$

[Equation 2]

$$\theta(\hat{k}) = \theta(\hat{k}-1) - \frac{\Gamma(k-1)\zeta(k)}{\lambda^* + \zeta(k)\Gamma(k-1)\zeta(k)} \cdot \left[\zeta(k)\hat{\theta}(k-1) - y(k)\right] \quad (2)$$

As a result, each process shown in FIG. 5 is terminated. In addition, the learning function 151 outputs the learned rate of change (ΔTs/ΔAs) of the turning torque Ts and the lateral acceleration As, that is, the inclination of the straight line portion of the solid line L1 shown in FIG. 4 to the reference turning torque calculation function 152 shown in FIG. 3. It should be noted that the initial value of the output of the learning function 151 can be set in advance to a likelihood value suitable for the specifications of the vehicle 10.

The reference turning torque calculation function 152 inputs the rate of change (ΔTs/ΔAs) of the turning torque Ts and the lateral acceleration As that is the output of the learning function 151, that is, the inclination of the straight line portion of the solid line L1 shown in FIG. 4 and the lateral acceleration As of the vehicle 10. The reference turning torque calculation function 152 calculates and outputs a reference turning torque Tsb by multiplying the rate of change (ΔTs/ΔAs) of the turning torque Ts and the lateral acceleration As by the lateral acceleration As of the vehicle 10.

The non-linearity determination function 153 inputs the reference turning torque Tsb that is the output of the reference turning torque calculation function 152 and the turning torque Ts that is the output of the turning actuator 15a. On the basis of these inputs, the non-linearity determination function 153 determines whether the cornering force characteristic is in a linear region where the cornering force characteristic becomes linear or the cornering force characteristic is in a nonlinear region where the cornering force characteristic becomes nonlinear. In addition, the non-linearity determination function 153 calculates, for example, the degree of non-linearity of the cornering force characteristic, that is, the nonlinear degree Dn that is an index indicating the degree of slip of the tires 11.

More specifically, the non-linearity determination function 153 calculates a difference ΔT between the reference turning torque Tsb that is the output of the reference turning torque calculation function 152 and the turning torque Ts that is the output of the turning actuator 15a. Here, the reference turning torque Tsb is a point on the straight line L2 shown by a dashed line in FIG. 4. As shown by the solid line L1 in FIG. 4, the straight line L2 includes the straight line portion in the relationship between the lateral acceleration As and the turning torque Ts learned by the learning function 151.

Thus, in the case where the turning torque Ts is on the straight line portion in the relationship between the lateral acceleration As and the turning torque Ts learned by the learning function 151, the difference ΔT between the reference turning torque Tsb and the turning torque Ts becomes substantially 0. On the other hand, when the lateral acceleration As increases and the relationship between the lateral acceleration As and the turning torque Ts becomes nonlinear, the difference ΔT between the reference turning torque Tsb on the straight line L2 and the turning torque Ts on the solid line L1 increases.

Accordingly, the non-linearity determination function 153 can determine whether the cornering force characteristic is in a linear region where the cornering force characteristic becomes linear or the cornering force characteristic is in a nonlinear region where the cornering force characteristic becomes nonlinear on the basis of the difference ΔT between the reference turning torque Tsb and the turning torque Ts. That is, in the case where the difference ΔT between the reference turning torque Tsb and the turning torque Ts is equal to or smaller than the threshold value, the non-linearity determination function 153 can determine that the cornering force characteristic is in a linear region where the cornering force characteristic becomes linear. In addition, in the case where the difference ΔT between the reference turning torque Tsb and the turning torque Ts exceeds the threshold value, the non-linearity determination function 153 can determine that the cornering force characteristic is in a nonlinear region where the cornering force characteristic becomes nonlinear.

Further, the non-linearity determination function 153 can calculate the nonlinear degree Dn that is the degree of non-linearity of the cornering force characteristic on the basis of the difference ΔT between the reference turning torque Tsb and the turning torque Ts. More specifically, the non-linearity determination function 153 can calculate the difference ΔT between the reference turning torque Tsb and the turning torque Ts as the nonlinear degree Dn. In addition, the non-linearity determination function 153 may calculate the nonlinear degree Dn by normalizing the difference ΔT between the reference turning torque Tsb and the turning torque Ts. This normalization can be performed, for example, by using the turning torque Ts at the critical point where the turning torque Ts changes from an increase to a decrease as shown by the solid line L1 in FIG. 4.

As shown in FIG. 3, the determination result of the previous period by the non-linearity determination function 153 can be input to the learning function 151. With this configuration, it is possible to suppress frequent changes in the determination result by the non-linearity determination function 153 near the boundary between the linear region and the nonlinear region of the cornering force characteristic.

Specifically, for example, the non-linearity determination function 153 may change the determination result in the case where the determination results executed a plurality of times are the same. Accordingly, it is possible to suppress hunting of the command value of the torque Tr as the reaction force calculated by the reaction force calculation function 160 to be described later. The non-linearity determination function 153 outputs the determination result and the nonlinear degree Dn to the reaction force calculation function 160 as shown in FIG. 2.

Figure 6:
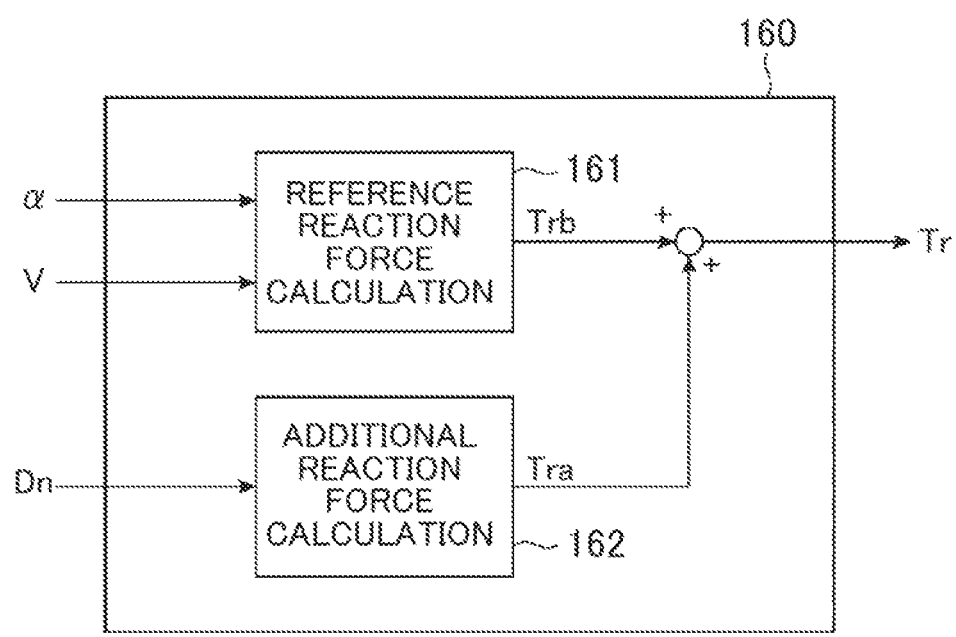
FIG. 6 is a functional block diagram for showing details of a reaction force calculation function of FIG. 2.

FIG. 6 is a functional block diagram for showing details of the reaction force calculation function 160 of FIG. 2. The reaction force calculation function 160 includes, for example, a reference reaction force calculation function 161 and an additional reaction force calculation function 162. The reference reaction force calculation function 161 calculates a command value of reference torque Trb as a reference reaction force against the operation of the driver by using the steering angle α of the steering wheel 13 by the driver of the vehicle 10 and the speed V of the vehicle 10 as inputs.

The reference reaction force calculation function 161 calculates the command value of torque as a reaction force on the basis of, for example, a spring component with respect to the steering angle α, a viscous component with respect to the steering angular speed that is a time differential of the steering angle α, a friction component, and the like. In addition, the reference reaction force calculation function 161 can change the command value of the reference torque Trb to be generated in the steering wheel 13 as the reference reaction force against the operation by the driver in accordance with the speed V of the vehicle 10 by changing, for example, the coefficients of the spring component, the viscous component, and the friction component in accordance with the speed V of the vehicle 10.

The additional reaction force calculation function 162 calculates a command value of additional torque Tra as an additional reaction force to be added to the command value of the reference reaction force calculated by the reference reaction force calculation function 161 by using the nonlinear degree Dn that is the output of the nonlinear degree calculation function 150 as an input. The additional reaction force calculation function 162 calculates, for example, the command value of the additional torque Tra in proportion to the magnitude of the nonlinear degree Dn. That is, the additional reaction force calculation function 162 calculates the command value of the additional torque Tra so that the command value of the additional torque Tra increases as the nonlinear degree Dn is larger and the command value of the additional torque Tra decreases as the nonlinear degree Dn is smaller.

More specifically, the additional reaction force calculation function 162 may be designed so as to increase the command value of the additional torque Tra as the additional reaction force, for example, linearly or quadratically with respect to the nonlinear degree Dn. It should be noted that in the linear region where the cornering force characteristic of the tires 11 becomes linear, the relationship between the lateral acceleration As and the turning torque Ts becomes linear and the nonlinear degree Dn becomes substantially 0, so that the command value of the additional torque Tra as the additional reaction force calculated by the additional reaction force calculation function 162 becomes substantially 0.

As shown in FIG. 6, the reaction force calculation function 160 adds the command value of the reference torque Trb as the reference reaction force that is the output of the reference reaction force calculation function 161 and the command value of the additional torque Tra as the additional reaction force that is the output of the additional reaction force calculation function 162. Accordingly, the reaction force calculation function 160 outputs the command value of the torque Tr as the reaction force against the operation of the steering wheel 13 by the driver.

Hereinafter, the action of the steering control device 100 of the embodiment will be described.

For example, in an electric power steering device, the operation force of the steering by the driver is assisted by an actuator and transmitted to the steered wheels via mechanical coupling between the steering wheel and the steered wheels. In this case, the driver can stably drive the vehicle by sensing the conditions of the tires and the road surface such as the friction coefficient and irregularities of the road surface through, for example, the steering column configuring the mechanical coupling between the steering wheel and the steered wheels.

On the other hand, in a steer-by-wire system in which the steering wheel and the turning mechanism for turning the tires are not mechanically connected to each other, the steering angle of the steering wheel by the driver is detected to control the tires that are steered wheels. In this case, the driver cannot sense the conditions of the tires and the road surface through the mechanical coupling between the steering wheel and the steered wheels. Therefore, for example, when the lateral force of the tires is saturated and the cornering force characteristic becomes nonlinear, there is a risk that it becomes difficult to stably drive the vehicle in such a case that the driver excessively operates the steering wheel and the vehicle becomes an understeer state.

Thus, the embodiment provides the steering control device 100 for controlling the reaction force actuator 16 that generates a reaction force against the operation of the driver in the steering wheel 13 of the vehicle 10 as described above. The steering control device 100 increases the reaction force in the nonlinear region where the cornering force characteristic that is the relationship between the slip angle and the lateral force of the tires 11 of the vehicle 10 is nonlinear, more than the reaction force in the linear region where the cornering force characteristic becomes linear.

Figure 7:
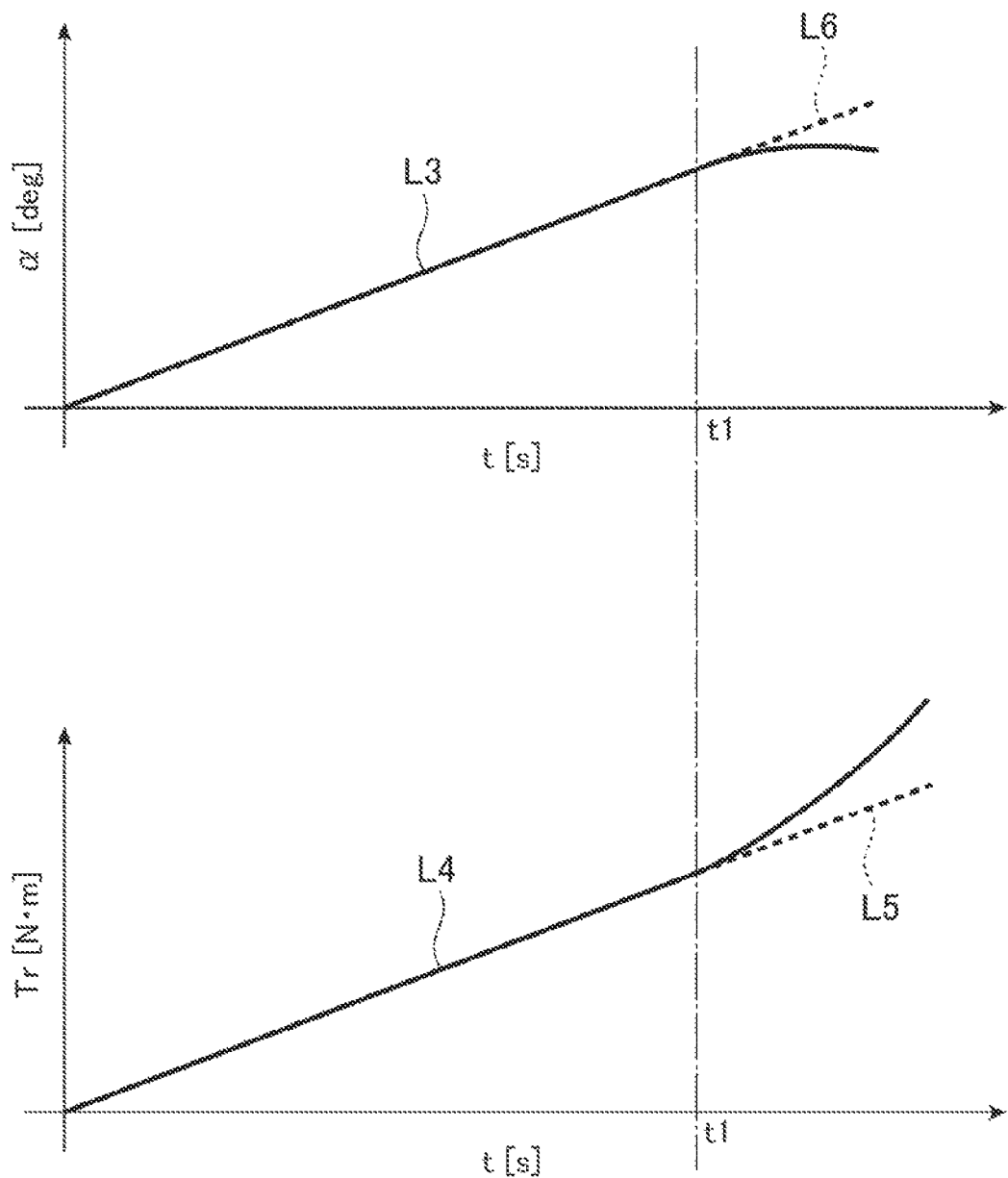
FIG. 7 shows graphs for explaining the operation of the steering control device of the first embodiment.

FIG. 7 shows graphs for explaining the operation of the steering control device 100 of the embodiment. The upper graph of FIG. 7 shows a state in which the steering angle α of the steering wheel 13 operated by the driver of the vehicle 10 increases at a substantially constant angular speed [deg/s] while the horizontal axis represents time t [s] and the vertical axis represents the steering angle α [deg]. The lower graph of FIG. 7 shows a state in which the torque Tr that is the reaction force generated in the steering wheel 13 against the operation of the driver increases as the steering angle α increases while the horizontal axis represents time t [s] and the vertical axis represents the torque Tr [Nm] generated by the reaction force actuator 16.

As shown in the upper graph of FIG. 7, until time t1, the driver of the vehicle 10 rotates the steering wheel 13 in one direction to increase the steering angle α shown by the solid line L3 at a constant angular speed. Until time t1, the lateral force of the tires 11 of the vehicle 10 is not saturated, and the cornering force characteristic of the tires 11 is in a linear region. In the linear region until time t1, as shown in the lower graph of FIG. 7, the steering control device 100 controls, for example, the reaction force actuator 16 to linearly increase the torque Tr as the reaction force shown by the solid line L4 as similar to the steering angle α.

Thereafter, at time t1, it is assumed that the lateral force of the tires 11 of the vehicle 10 is saturated for some reason, and the cornering force characteristic of the tires 11 shifts from the linear region to the nonlinear region. Then, the steering control device 100 controls the reaction force actuator 16 to increase the torque Tr as the reaction force in the nonlinear region after time t1 shown by the solid line L4, more than the torque Tr as the reaction force in the linear region shown by the broken line L5 as shown in the lower graph of FIG. 7.

Accordingly, in order to increase the steering angle α by rotating the steering wheel 13, it is necessary for the driver to apply a larger force against the torque Tr as the reaction force. As a result, the driver can sense that the operation of the steering wheel 13 has become heavy and can stop the operation of increasing the steering angle α. As described above, by increasing the reaction force transmitted to the driver by the reaction force actuator 16, the steering control device 100 can notify the driver of the fact that the condition is at the grip limit of the tires 11, that is, in the nonlinear region where further performance improvement of the tires 11 is difficult. In addition, the steering control device 100 can also suppress the driver from attempting to increase the steering angle α by increasing the reaction force against the operation of the steering wheel 13 by the driver.

As a result, as shown in the upper graph of FIG. 7, in the nonlinear region after time t1, the steering angle α shown by the solid line L3 in the case where the torque Tr as the reaction force is increased decreases as compared with the steering angle α shown by the broken line L6 in the case where the torque Tr as the reaction force is not increased. Accordingly, for example, in the nonlinear region where the cornering force characteristic of the tires 11 of the vehicle 10 becomes nonlinear, it is possible to prevent the driver from excessively increasing the steering angle α of the steering wheel 13 and to suppress the vehicle 10 from becoming an understeer state. Thus, according to the embodiment, it is possible to provide the steering control device 100 capable of transmitting an appropriate reaction force by the driver via the steering wheel 13 and improving the stability of the vehicle 10.

In addition, as shown in, for example, FIG. 1 and FIG. 2, the steering control device 100 of the embodiment acquires the steering angle α of the steering wheel 13 operated by the driver of the vehicle 10. Then, as shown in, for example, FIG. 7, the steering control device 100 increases the torque Tr as the reaction force against the operation of the steering wheel 13 by the driver in accordance with an increase in the steering angle α in the nonlinear region after time t1 when the relationship between the slip angle and the lateral force of the tires 11 becomes nonlinear.

With this configuration, when the driver attempts to increase the steering angle α by rotating the steering wheel 13 in the nonlinear region where the cornering force characteristic that is the relationship between the slip angle and the lateral force of the tires 11 becomes nonlinear, the driver receives the torque Tr as a larger reaction force. Accordingly, it is possible to suppress the steering angle α of the steering wheel 13 from increasing in the nonlinear region where the lateral force of the tires 11 is saturated, and to improve the stability of the vehicle 10.

In addition, as shown in, for example, FIG. 1 and FIG. 2, the steering control device 100 of the embodiment acquires the lateral acceleration As of the vehicle 10 and the turning torque Ts for turning the tires 11. Then, as shown in, for example, FIG. 4, the steering control device 100 calculates the rate of change (ΔTs/ΔAs) of the increased amount ΔAs of the lateral acceleration As and the increased amount ΔTs of the turning torque Ts in a region where the relationship between the lateral acceleration As and the turning torque Ts becomes linear. Further, as shown in, for example, FIG. 3, the steering control device 100 calculates the nonlinear degree Dn of the cornering force characteristic on the basis of the difference between the reference turning torque Tsb obtained by multiplying the rate of change (ΔTs/ΔAs) by the lateral acceleration As and the turning torque Ts.

With this configuration, the degree of non-linearity of the cornering force characteristic of the tires 11 can be estimated on the basis of the lateral acceleration As of the vehicle 10 and the turning torque Ts for turning the tires 11. The cornering force characteristic is the relationship between the slip angle and the lateral force of the tires 11 as described above. However, in order to measure the lateral force of the tires 11, a dedicated sensor is required, and there are problems such as an increase in cost, a decrease in maintainability, and a complicated configuration. In addition, it is difficult to accurately measure the lateral force of the tires 11 by a sensor for detecting deformation of the tires 11 or the like.

On the other hand, the steering control device 100 of the embodiment can calculate the nonlinear degree Dn of the cornering force characteristic of the tires 11 on the basis of the lateral acceleration As of the vehicle 10 and the turning torque Ts. Therefore, the steering control device 100 estimates the degree of non-linearity of the cornering force characteristic of the tires 11 on the basis of the nonlinear degree Dn, can control the reaction force actuator 16 according to the degree of non-linearity, and can return an appropriate reaction force against the operation of the steering wheel 13 by the driver. Thus, according to the steering control device 100 of the embodiment, the shift of the tires 11 to the nonlinear region can be suppressed, and the stability of the vehicle 10 can be improved even in the case where the tires 11 shift to the nonlinear region.

In addition, as shown in, for example, FIG. 6, the steering control device 100 of the embodiment acquires the speed V of the vehicle 10, and calculates the reference torque Trb as the reference reaction force against the operation of the steering wheel 13 by the driver on the basis of the speed V and the steering angle α. In addition, the steering control device 100 calculates the additional torque Tra as the additional reaction force against the operation of the steering wheel 13 by the driver on the basis of the nonlinear degree Dn. Then, the steering control device 100 calculates the torque Tr as the reaction force by adding the reference reaction force and the additional reaction force.

With this configuration, in the linear region of the cornering force characteristic of the tires 11, the nonlinear degree Dn becomes substantially 0, so that the additional torque Tra becomes substantially 0. Therefore, in the linear region, the steering control device 100 causes the reaction force actuator 16 to generate the reference torque Trb based on the speed V and the steering angle α in the steering wheel 13 of the vehicle 10 as the reaction force against the operation of the driver. On the other hand, in the nonlinear region of the cornering force characteristic of the tires 11, the additional torque Tra increases as the nonlinear degree Dn increases. Therefore, in the nonlinear region, the steering control device 100 causes the reaction force actuator 16 to generate the sum of the additional torque Tra increased as the nonlinear degree Dn increases and the reference torque Trb in the steering wheel 13 of the vehicle 10 as the reaction force against the operation of the driver. Accordingly, the steering control device 100 can increase the reaction force in the nonlinear region where the cornering force characteristic that is the relationship between the slip angle and the lateral force of the tires 11 of the vehicle 10 becomes nonlinear, more than the reaction force in the linear region where the cornering force characteristic becomes linear.

In addition, the steering control device 100 of the embodiment acquires the speed V of the vehicle 10 as shown in, for example, FIG. 1 and FIG. 3. Then, as shown in, for example, FIG. 5, the steering control device 100 executes the learning process P4 in the case where the lateral acceleration As is equal to or larger than the threshold value, the speed V is equal to or larger than the threshold value, and the cornering force characteristic of the tires 11 is in a linear region. The learning process P4 is a process for learning the rate of change (ΔTs/ΔAs) of the increased amount ΔAs of the lateral acceleration As and the increased amount ΔTs of the turning torque Ts.

With this configuration, the steering control device 100 of the embodiment can learn, for example, the inclination of the straight line L2 including the straight line portion in which the relationship between the lateral acceleration As and the turning torque Ts shown by the solid line L1 becomes linear under appropriate conditions. The inclination of the straight line L2 is, that is, the rate of change (ΔTs/ΔAs) of the increased amount ΔAs of the lateral acceleration As and the increased amount ΔTs of the turning torque Ts in the linear region where the cornering force characteristic of the tires 11 becomes linear. By learning the rate of change (ΔTs/ΔAs) under appropriate conditions, it is possible to improve the accuracy of the nonlinear degree Dn indicating the degree of non-linearity of the cornering force characteristic of the tires 11.

In addition, the steering control device 100 of the embodiment calculates the rate of change (ΔTs/ΔAs) of the increased amount ΔAs of the lateral acceleration As and the increased amount ΔTs of the turning torque Ts by, for example, the sequential least squares method. With this configuration, it is possible to accurately obtain the rate of change (ΔTs/ΔAs) of the increased amount ΔAs of the lateral acceleration As and the increased amount ΔTs of the turning torque Ts on the basis of the time-series data of the lateral acceleration As of the vehicle 10 and the time-series data of the turning torque Ts that are sequentially obtained from the acceleration sensor 17 and the steering actuator 15a.

In addition, as described above, the steering control device 100 of the embodiment acquires the lateral acceleration As of the vehicle 10 and the turning torque Ts for turning the tires 11. Further, as described above, the steering control device 100 calculates the rate of change (ΔTs/ΔAs) of the increased amount ΔAs of the lateral acceleration As and the increased amount ΔTs of the turning torque Ts in a region where the relationship between the lateral acceleration As and the turning torque Ts becomes linear. Further, the steering control device 100 determines that the cornering force characteristic of the tires 11 is a linear region in the case where the difference between the reference turning torque Tsb obtained by multiplying the rate of change (ΔTs/ΔAs) by the lateral acceleration As and the turning torque Ts is equal to or smaller than the threshold value, and determines that the cornering force characteristic of the tires 11 is in a nonlinear region in the case where the difference exceeds the threshold value.

With this configuration, it is possible to determine whether the cornering force characteristic of the tires 11 is in a linear region or a nonlinear region by the nonlinear degree Dn calculated on the basis of the lateral acceleration As of the vehicle 10 and the turning torque Ts. Thus, according to the steering control device 100 of the embodiment, since a dedicated sensor for measuring the lateral force of the tires 11 is not required, it is possible to realize a decrease in cost, improvement in maintainability, simplification of the configuration, and the like.

In addition, as described above, the steering control device 100 of the embodiment acquires the lateral acceleration As of the vehicle 10 and the turning torque Ts for turning the tires 11. In this case, as shown in, for example, FIG. 4, the steering control device 100 can detect the shift of the cornering force characteristic of the tires 11 from a linear region to a nonlinear region in the case where the lateral acceleration As increases and the turning torque Ts changes from an increase to a decrease.

With this configuration, it is possible to determine whether the cornering force characteristic of the tires 11 is in a linear region or a nonlinear region on the basis of the lateral acceleration As of the vehicle 10 and the turning torque Ts. Thus, according to the steering control device 100 of the embodiment, since a dedicated sensor for measuring the lateral force of the tires 11 is not required, it is possible to realize a decrease in cost, improvement in maintainability, simplification of the configuration, and the like.

In addition, as described above, the steering control device 100 of the embodiment generates the reaction force against the operation of the driver in the steering wheel 13 in the case where the steering wheel 13 and the turning mechanism 15 for turning the tires 11 are not mechanically connected to each other. With this configuration, in the vehicle 10 employing the steer-by-wire system, it is possible to notify the driver of the fact that the cornering force characteristic of the tires 11 has shifted from the linear region to the nonlinear region by the reaction force against the operation of the steering wheel 13 by the driver.

As described above, according to the embodiment, it is possible to provide the steering control device 100 capable of transmitting an appropriate reaction force by the driver via the steering wheel 13 and improving the stability of the vehicle 10.

Second Embodiment

Figure 8:
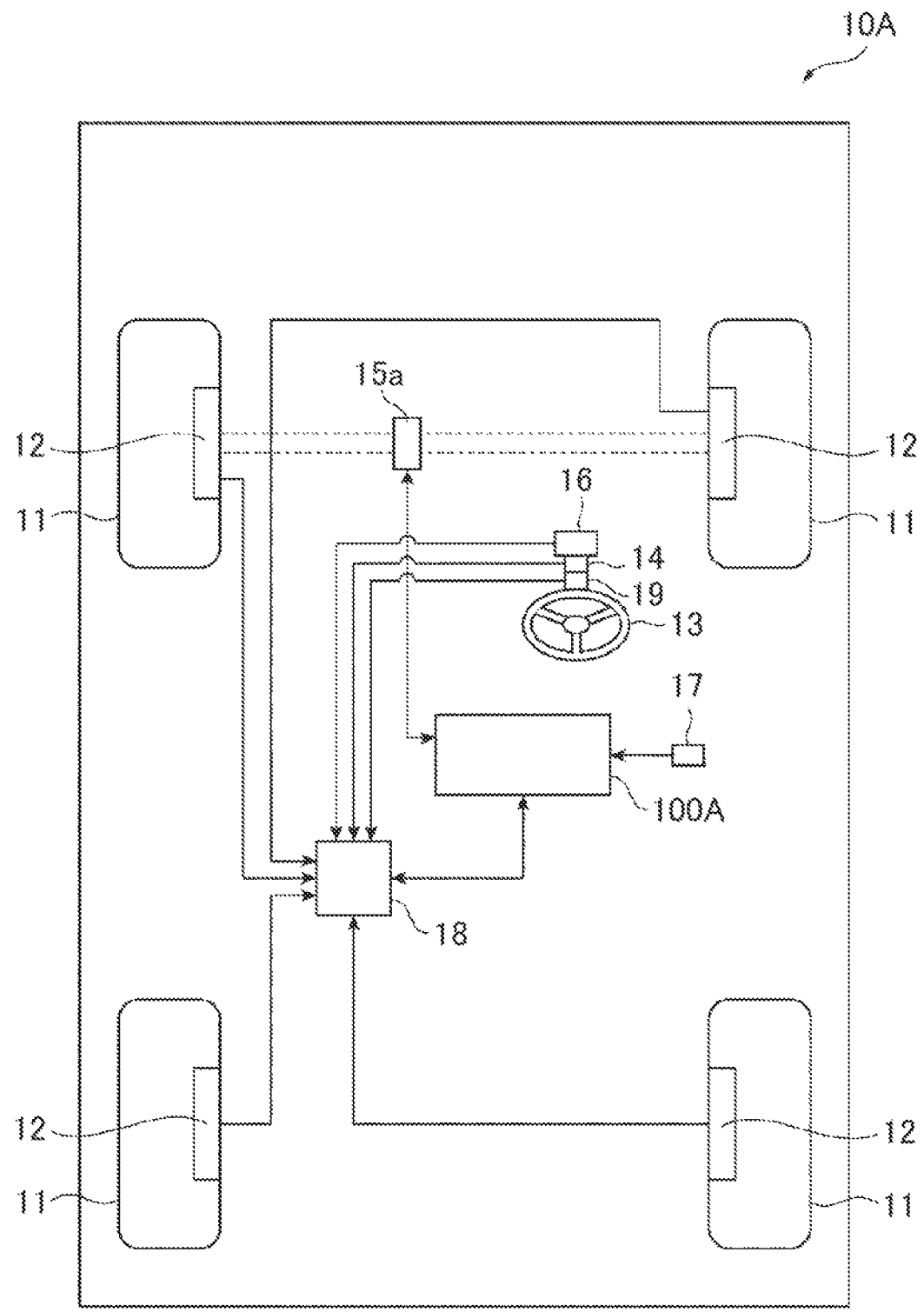
FIG. 8 is a schematic configuration diagram for showing a second embodiment of a steering control device according to the present disclosure.

Next, a second embodiment of a steering control device according to the present disclosure will be described with reference to FIG. 8 to FIG. 11. FIG. 8 is a schematic configuration diagram for showing the second embodiment of the steering control device according to the present disclosure. As similar to the steering control device 100 of the above-described first embodiment, a steering control device 100A of the embodiment is a microcontroller mounted on a vehicle 10A, and controls a reaction force actuator 16 that generates a reaction force in the direction opposite to the operating direction by the driver in a steering wheel 13.

In the example shown in FIG. 8, the vehicle 10A differs from the vehicle 10 shown in FIG. 1 in that a steering torque sensor 19 is provided and the function of the turning angle control unit 15b of the turning mechanism 15 is substituted by the steering control device 100A. The steering torque sensor 19 detects a steering torque Td by the operation of the steering wheel 13 by the driver and outputs the same to the steering control device 100A via a communication bus line 18. Since the other configurations of the vehicle 10A are similar to those of the vehicle 10 shown in FIG. 1, the same reference numerals are added to the similar parts, and the description thereof will be omitted.

Figure 9:
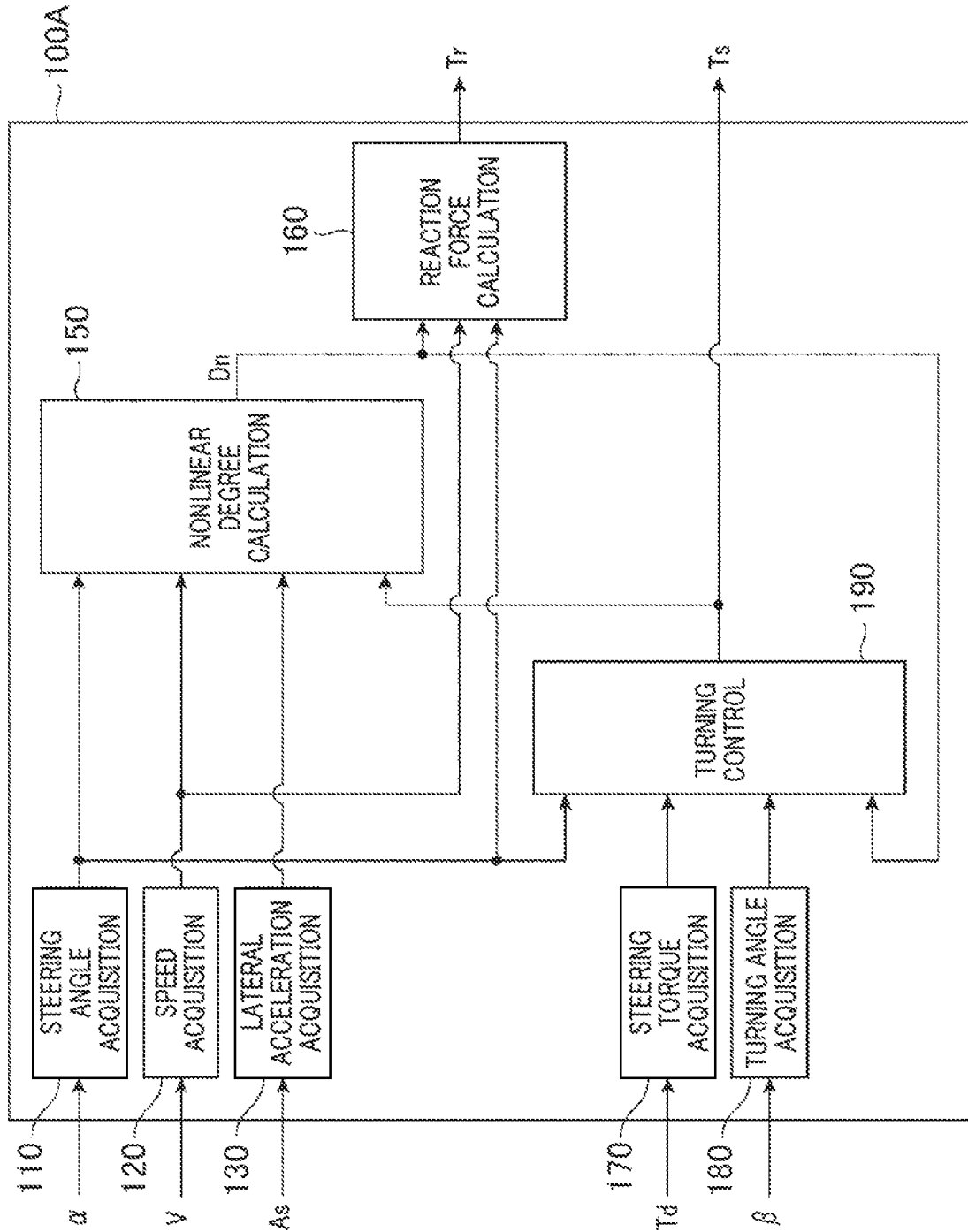
FIG. 9 is a functional block diagram of the steering control device shown in FIG. 8.

FIG. 9 is a functional block diagram of the steering control device 100A shown in FIG. 8. As similar to the steering control device 100 according to the first embodiment, the steering control device 100A of the embodiment is an electronic control device or a part thereof configured using a microcontroller including an arithmetic device, a main storage device, an auxiliary storage device, an input/output device, a timer, and the like.

The steering control device 100A includes, for example, a steering angle acquisition function 110, a speed acquisition function 120, a lateral acceleration acquisition function 130, a nonlinear degree calculation function 150, and a reaction force calculation function 160. Each of these functions is similar to that in the steering control device 100 of the above-described first embodiment, and thus the description thereof will be omitted.

In addition, the steering control device 100A of the embodiment further has a steering torque acquisition function 170, a turning angle acquisition function 180, and a turning control function 190. Each of these functions can be realized, for example, by periodically executing a program loaded in the main storage device by the arithmetic device while referring to a database stored in the auxiliary storage device in the steering control device 100A.

The steering torque acquisition function 170 acquires, for example, the steering torque Td detected by the steering torque sensor 19 via the communication bus line 18. The turning angle acquisition function 180 acquires, for example, the turning angle β of the tires 11 output from the turning actuator 15a. The turning control function 190 uses, for example, the steering angle α, the steering torque Td, the turning angle R, and the nonlinear degree Dn as inputs.

Figure 10:
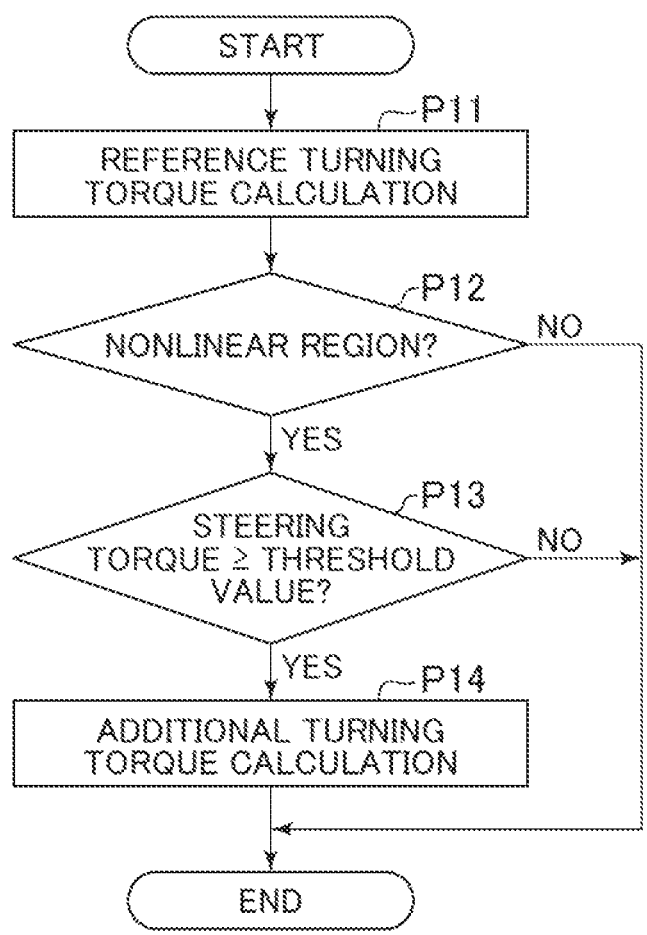
FIG. 10 is a flowchart for explaining the operation of a turning control function in the steering control device shown in FIG. 9.

FIG. 10 is a flowchart for explaining the operation of the turning control function 190 shown in FIG. 9. For example, the turning control function 190 repeatedly executes each process from the start to the end shown in FIG. 10 in a predetermined period.

When the processing flow shown in FIG. 10 is started, the turning control function 190 first executes a process P 11 for calculating the reference turning torque Tsb on the basis of the input information. Specifically, the turning control function 190 calculates the reference turning torque Tsb necessary for correcting the turning angle β on the basis of, for example, the relationship between the steering angle α and the turning angle β. The relationship between the steering angle α and the turning angle β can be defined by, for example, a pseudo gear ratio, and stored in the auxiliary storage device or the like configuring the steering control device 100A. Accordingly, the reference turning torque Tsb can be easily calculated.

Next, the turning control function 190 executes a determination process P12 of whether or not the cornering force characteristic of the tires 11 is a nonlinear region on the basis of the nonlinear degree Dn calculated by the nonlinear degree calculation function 150. The determination process P12 can be performed, for example, by determining whether or not the nonlinear degree Dn exceeds a threshold value.

If it is determined in the determination process P12 that the cornering force characteristic of the tires 11 is not in a nonlinear region (NO), that is, in a linear region, the turning control function 190 terminates the processing flow shown in FIG. 10 and outputs the reference turning torque Tsb calculated in the process P11 as the turning torque Ts. In addition, if it is determined in the determination process P12 that the cornering force characteristic of the tires 11 is in a nonlinear region (YES), the turning control function 190 executes the next determination process P13.

In the determination process P13, the turning control function 190 determines whether or not the steering torque Td is equal to or larger than a threshold value. The threshold value of the steering torque Td can be set to, for example, a value obtained by adding a predetermined margin to the steering torque Td when the cornering force characteristic of the tires 11 shifts from the linear region to the nonlinear region.

If it is determined in the determination process P13 that the steering torque Td is not equal to or larger than the threshold value (NO), that is, smaller than the threshold value, the turning control function 190 terminates the processing flow shown in FIG. 10 and outputs the command value of the turning torque Ts calculated in the process P11. In addition, if it is determined in the determination process P13 that the steering torque Td is equal to or larger than the threshold value (YES), the turning control function 190 executes the next process P14.

The turning control function 190 calculates additional turning torque Tsa corresponding to the magnitude of the steering torque Td in the process P14, and outputs a value obtained by adding the additional turning torque Tsa to the reference turning torque Tsb calculated in the process P11 as the turning torque Ts. In addition, in the case where the steering torque Td equal to or larger than the threshold value continues for a predetermined certain period of time in the process P14, the turning control function 190 may add torque in the reverse direction to the turning torque Ts calculated in the process P11 to decrease the torque Tr as a reaction force. As a result, the processing flow shown in FIG. 10 is terminated.

Hereinafter, the action of the steering control device 100A of the embodiment will be described.

Figure 11:
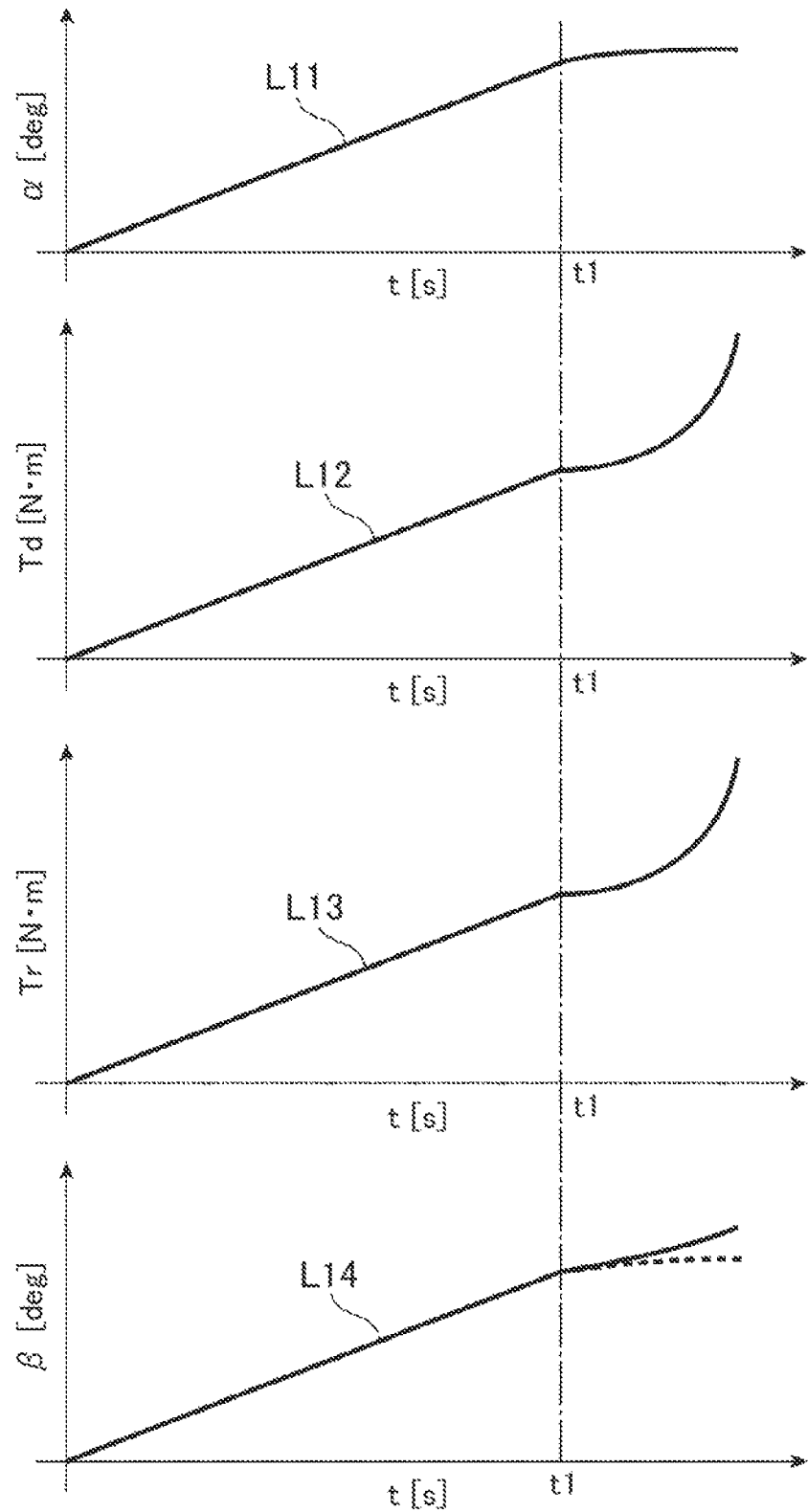
FIG. 11 shows graphs for explaining an example of the operation of the steering control device of the second embodiment.

FIG. 11 shows graphs for explaining an example of the operation of the steering control device 100A of the embodiment. In FIG. 11, the horizontal axis of each graph represents time t [s]. In addition, in FIG. 11, the top graph has the vertical axis of the steering angle α [deg], the second graph from the top has the vertical axis of the steering torque Td [Nm], the third graph from the top has the vertical axis of the torque Tr [Nm] as a reaction force, and the bottom graph has the vertical axis of the turning angle β [deg].

As shown in the top graph of FIG. 11, until time t1, the driver of the vehicle 10A rotates the steering wheel 13 in one direction to increase the steering angle α shown by the solid line L11 at a constant angular speed. Until time t1, the lateral force of the tires 11 of the vehicle 10A is not saturated, and the cornering force characteristic of the tires 11 is in a linear region.

In the linear region until time t1, as shown in the third graph from the top of FIG. 11, the steering control device 100A controls, for example, the reaction force actuator 16 to linearly increase the torque Tr as the reaction force shown by the solid line L13 as similar to the steering angle $\alpha$. In addition, as shown in the bottom graph of FIG. 11, the steering control device 100A controls, for example, the turning actuator 15a to linearly increase the turning angle $\beta$ of the tires 11 as similar to the steering angle $\alpha$.

Thereafter, at time t1, it is assumed that the lateral force of the tires 11 of the vehicle 10A is saturated for some reason, and the cornering force characteristic of the tires 11 shifts from the linear region to the nonlinear region. Then, the steering control device 100A controls the reaction force actuator 16 to increase the torque Tr as the reaction force in the nonlinear region after time t1 shown by the solid line L13, more than the torque Tr as the reaction force in the linear region as shown in the third graph from the top of FIG. 11.

Accordingly, in order to increase the steering angle $\alpha$ by rotating the steering wheel 13, it is necessary for the driver to apply a larger force against the torque Tr as the reaction force. As a result, the operation of the driver to increase the steering angle $\alpha$ is suppressed, and an increase in the steering angle $\alpha$ shown in the top graph of FIG. 11 is moderated. However, even in the nonlinear region after time t1, the driver increases the steering torque Td as shown by the solid line L12 in the second graph from the top of FIG. 11.

In this case, the steering control device 100A determines that the steering torque Td is equal to or larger than the threshold value, for example, in the determination process P13 performed by the turning control function 190, and executes the above-described process P14. Accordingly, the steering control device 100A calculates the additional turning torque Tsa corresponding to the magnitude of the steering torque Td, and outputs a value obtained by adding the additional turning torque Tsa to the turning torque Ts calculated in the above-described process P11 as the turning torque Ts.

As described above, the steering control device 100A of the embodiment acquires the steering torque Td of the steering wheel 13 operated by the driver, and increases the turning torque Ts for turning the tires 11 in the case where the steering torque Td is equal to or larger than the threshold value in the nonlinear region. With this configuration, for example, as shown in the second graph from the top of FIG. 11, an increase in the steering torque Td in the nonlinear region after time t1 can be detected, and the intention of the driver to increase the turning angle $\beta$ can be reflected in the control of the vehicle 10A.

In addition, as shown in, for example, the second graph from the top of FIG. 11, the steering control device 100A of the embodiment decreases the torque Tr as the reaction force in the case where the steering torque Td equal to or larger than the threshold value continues for a certain period of time in the nonlinear region after time t1. With this configuration, the intention of the driver to increase the turning angle $\beta$ of the steering wheel 13 can be reflected in the control of the vehicle 10A.

In addition, the steering control device 100A of the embodiment acquires the steering angle $\alpha$ of the steering wheel 13 operated by the driver and the turning angle $\beta$ of the tires 11. Then, the steering control device 100A calculates the reference turning torque Tsb on the basis of the relationship between the steering angle $\alpha$ and the turning angle $\beta$. Further, in the case where the turning torque Ts is equal to or larger than the threshold value in the nonlinear region, the steering control device 100A calculates additional turning torque Tda corresponding to the magnitude of the steering torque Td, and outputs a value obtained by adding the additional turning torque Tda to a reference turning torque Tdb as the turning torque Ts.

With this configuration, the turning torque Ts for turning the tires 11 can be increased, and as shown in the bottom graph of FIG. 11, the turning angle $\beta$ shown by the solid line L14 can be increased in the nonlinear region after time t1. Thus, the intention of the driver to increase the turning angle $\beta$ of the steering wheel 13 can be reflected in the control of the vehicle 10A.

As described above, according to the steering control device 100A of the embodiment, not only the similar effect to that of the steering control device 100 of the above-described first embodiment can be achieved, but also the operation of the driver can be reflected in the control of the vehicle 10A by giving priority to the operation of the driver.

Third Embodiment

Figure 12:
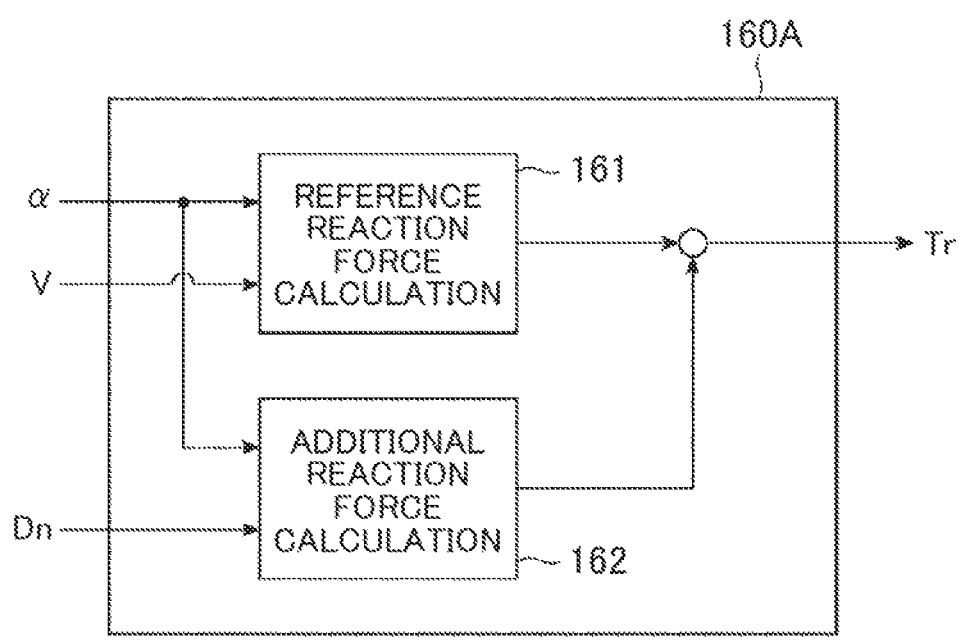
FIG. 12 is a functional block diagram of a reaction force calculation function in a steering control device of a third embodiment.

Next, a third embodiment of a steering control device according to the present disclosure will be described by using FIG. 1 to FIG. 5 and referring to FIG. 12 to FIG. 15. In the steering control device of the embodiment, the configuration of a reaction force calculation function 160A shown in FIG. 12 is different from the reaction force calculation function 160 of the steering control device 100 according to the first embodiment. Since the other configurations of the steering control device of the embodiment are similar to those of the steering control device 100 of the above-described first embodiment, the similar reference numerals are added to the similar parts, and the description thereof will be omitted.

As shown in FIG. 12, in the steering control device of the embodiment, the steering angle $\alpha$ of the steering wheel 13 detected by the steering angle sensor 14 is input to the additional reaction force calculation function 162 of the reaction force calculation function 160A in addition to the nonlinear degree Dn.

Figure 13:
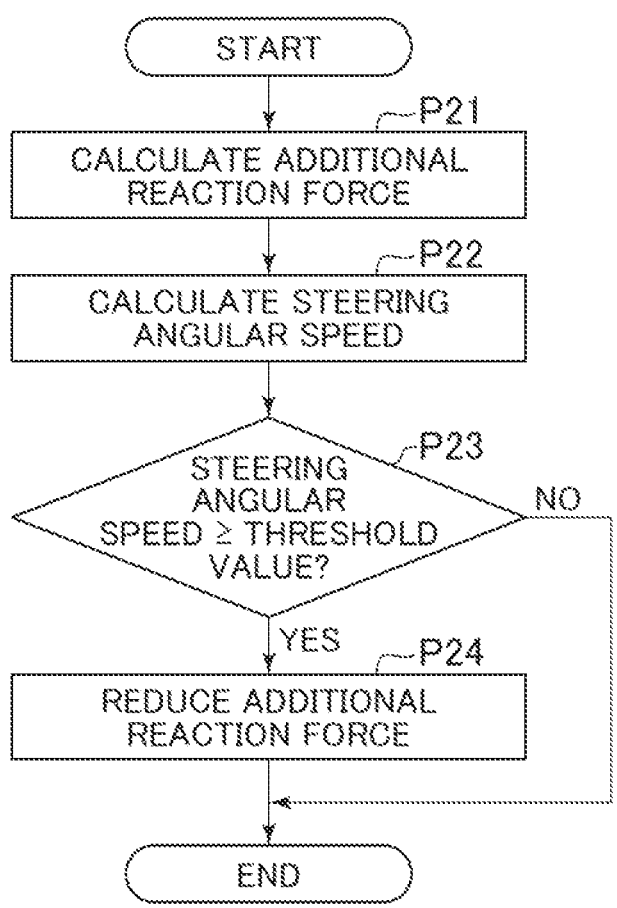
FIG. 13 is a flowchart for explaining the operation of the reaction force calculation function shown in FIG. 12.

FIG. 13 is a flowchart for explaining the operation of the reaction force calculation function 160A shown in FIG. 12. The steering control device of the embodiment repeatedly executes the processing flow shown in FIG. 13 in a predetermined period. The reaction force calculation function 160A first allows the additional reaction force calculation function 162 to execute a process P21 for calculating the additional torque Tra as the additional reaction force, as similar to the reaction force calculation function 160 of the first embodiment.

Next, the reaction force calculation function 160A executes a process P22 for calculating a steering angular speed. In the process P22, the additional reaction force calculation function 162 calculates, for example, a steering angular speed that is a time differential value of the steering angle $\alpha$, and proceeds to the next determination process P23. In the determination process P23, the additional reaction force calculation function 162 determines whether or not the steering angular speed calculated in the previous process P22 is equal to or larger than a threshold value.

If it is determined in the determination process P23 that the steering angular speed is not equal to or larger than the threshold value (NO), the additional reaction force calculation function 162 outputs the additional torque Tra calculated in the process P21, and terminates the processing flow shown in FIG. 13. On the other hand, if it is determined in the determination process P23 that the steering angular speed is equal to or larger than the threshold value (YES), the additional reaction force calculation function 162 executes the next process P24.

In the process P24, the additional reaction force calculation function 162 decreases the additional torque Tra as the additional reaction force calculated in the process P21 on the basis of the magnitude of the steering angular speed. Here, the process P24 for decreasing the additional torque Tra is, for example, a process for subtracting a value obtained by multiplying the steering angular speed calculated in the process P22 by the gain from the additional torque Tra. As a result, the processing flow shown in FIG. 13 is terminated.

Next, the action of the steering control device of the embodiment will be described.

Figure 14:
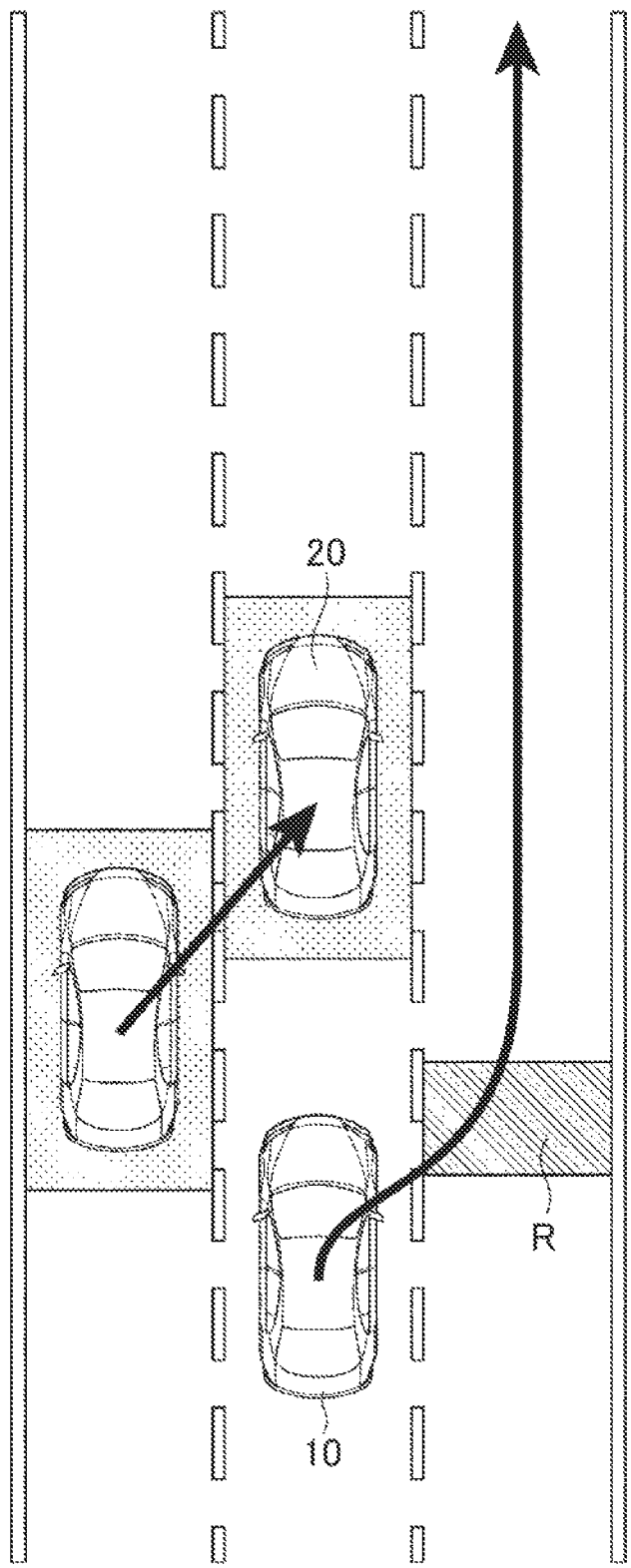
FIG. 14 is a plan view for showing a state in which a vehicle equipped with the steering control device of the third embodiment travels.
Figure 15:
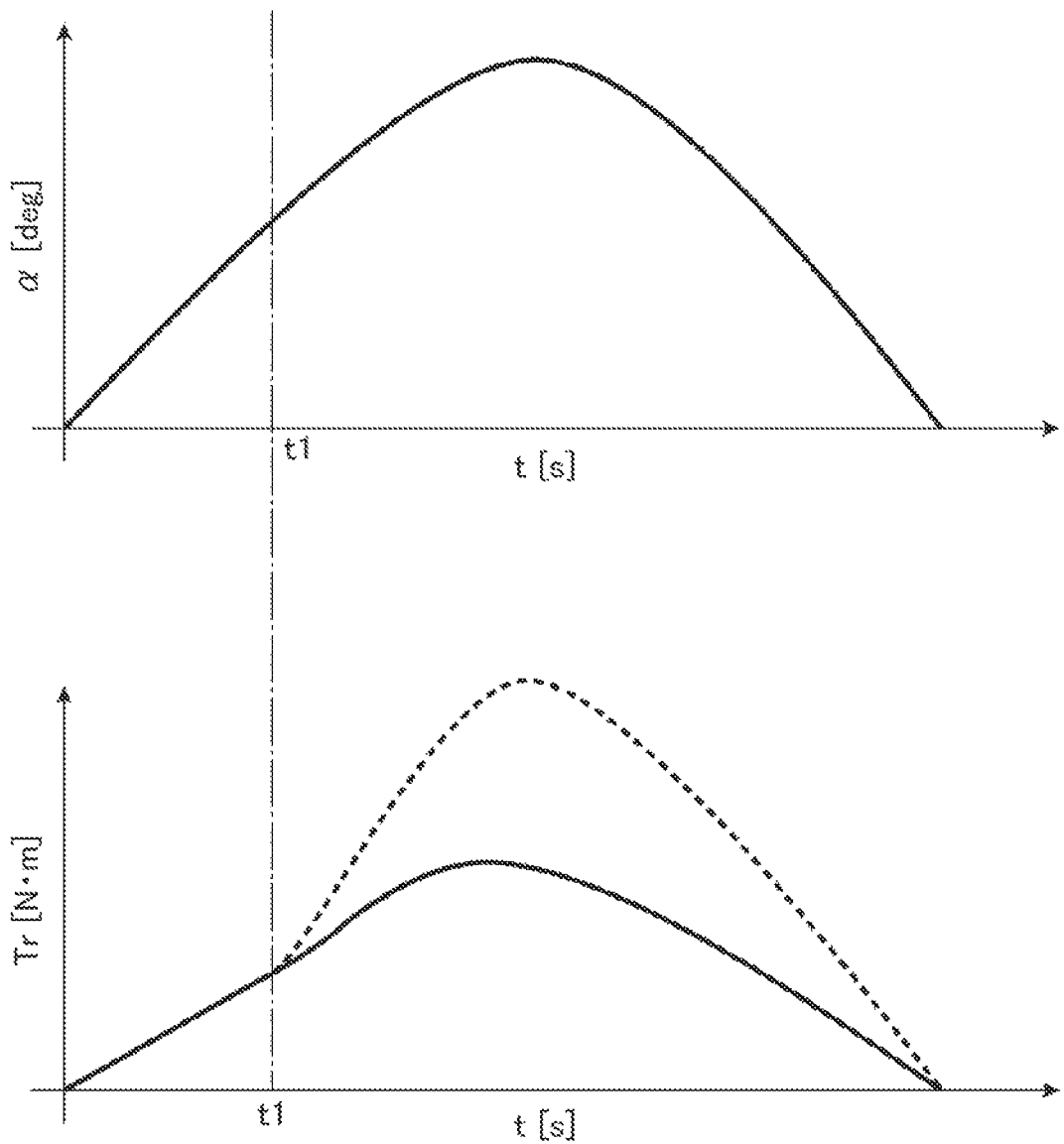
FIG. 15 shows graphs for explaining the operation of the steering control device of the third embodiment.

FIG. 14 is a plan view for showing a state in which the vehicle 10 equipped with the steering control device of the embodiment is traveling on a road having a plurality of lanes. FIG. 15 shows graphs for explaining the operation of the steering control device according to the embodiment. In the upper graph of FIG. 15, the horizontal axis represents time [s] and the vertical axis represents the steering angle α [deg] of the steering wheel 13. In the lower graph of FIG. 15, the horizontal axis represents time t [s] and the vertical axis represents torque Tr [Nm] as a reaction force against the operation of the steering wheel 13 by the driver.

As shown in FIG. 14, it is assumed that from the left lane adjacent to the center lane in which the vehicle 10 travels, another vehicle 20 cuts into the center lane in front of the vehicle 10. In this case, it is conceivable that the driver of the vehicle 10 performs emergency avoidance by suddenly operating the steering wheel 13 in order to avoid collision with the vehicle 20.

In such a sudden operation of the steering wheel 13 at the time of emergency avoidance, the steering angle α of the steering wheel 13 operated by the driver becomes excessively large in some cases relative to the steering angle necessary for emergency avoidance. When the steering angle α becomes excessively large, there is a risk that the turning angle β, of the tires 11 becomes excessively large, the lateral force of the tires 11 of the vehicle 10 during high-speed traveling is saturated, the cornering force characteristic shifts from the linear region to the nonlinear region, and the traveling of the vehicle 10 becomes unstable.

On the other hand, the steering control device of the embodiment acquires the steering angular speed of the steering wheel 13 operated by the driver as shown in the process P21 to the process P22 of FIG. 13. Further, as shown in the determination process P23 to the process P24 of FIG. 13, in the case where the steering angular speed exceeds a prescribed threshold value, the steering control device of the embodiment limits the rate of increase of the reaction force against the operation of the steering wheel 13 by the driver of the vehicle 10 to a prescribed upper limit value.

For example, it is assumed that the cornering force characteristic of the tires 11 of the vehicle 10 has shifted from the linear region to the nonlinear region in the region R shown by oblique hatching in FIG. 14. Then, as shown in, for example, FIG. 15, the steering control device of the embodiment increases the torque Tr as the reaction force against the operation of the steering wheel 13 by the driver until the steering angular speed exceeds the prescribed threshold value at time t1. Accordingly, the driver can sense that the cornering force characteristic of the tires 11 of the vehicle 10 has shifted from the linear region to the nonlinear region through the reaction force against the operation of the steering wheel 13.

In addition, as shown in, for example, FIG. 15, if the steering angular speed exceeds the prescribed threshold value at time t1, the steering control device of the embodiment limits the rate of increase of the reaction force against the operation of the steering wheel 13 by the driver of the vehicle 10 to the prescribed upper limit value. Accordingly, the torque Tr as the reaction force against the operation of the steering wheel 13 by the driver is prevented from rapidly increasing, and the steering angle α of the steering wheel 13 is prevented from rapidly decreasing.

Therefore, the torque Tr as the reaction force against the operation of the steering wheel 13 by the driver is prevented from repeating the rapid increase and decrease, the anxiety of the driver at the time of emergency avoidance is eliminated, and the operation of the steering wheel 13 can be more easily performed. Thus, according to the steering control device of the embodiment, it is possible to transmit an appropriate reaction force by the driver via the steering wheel 13 and improve the stability of the vehicle 10.

Although the embodiments of the steering control device according to the present disclosure have been described above in detail by using the drawings, the concrete configuration is not limited to the embodiments, and even if there are design changes or the like within the scope not departing from the gist of the present disclosure, they are included in the present disclosure.

For example, the steering control device of the present disclosure can be applied to a vehicle employing a conventional electric power steering system. In this case, the relationship between the output of the assist motor and the lateral acceleration of the vehicle is learned as similar to the above-described learning function, and the nonlinear degree is calculated on the basis of the difference between the reference torque and the turning torque. In the case where it is determined that the tires of the vehicle are in the linear region on the basis of the nonlinear degree, the amount of assist is given in the same manner as before. In addition, in the case where it is determined that the tires of the vehicle are in the nonlinear region, the output torque of the assist motor is decreased, and the amount of assist by the motor is decreased, so that the reaction force against the operation of the steering wheel by the driver can be increased. Accordingly, it is possible to improve the stability of the vehicle during traveling.

LIST OF REFERENCE SIGNS 10 vehicle
11 tire
13 steering wheel
15 turning mechanism
16 reaction force actuator
100 steering control device
100A steering control device
As lateral acceleration
Td steering torque
Tr torque (reaction force)
Tra additional torque (additional reaction force)
Trb reference torque (reference reaction force)
Ts turning torque
Tsa additional turning torque
Tsb reference turning torque
V speed α steering angle
β turning angle
ΔAs increased amount of lateral acceleration
ΔTs increased amount of turning torque
ΔTs/ΔAs rate of change

The invention claimed is:

1. A steering control device for controlling a reaction force actuator that generates a reaction force against an operation of a driver in a steering wheel of a vehicle,
wherein the reaction force in a nonlinear region where a cornering force characteristic that is the relationship between the slip angle and the lateral force of tires of the vehicle becomes nonlinear is increased more than that in a linear region where the cornering force characteristic becomes linear,
wherein the steering angle of the steering wheel operated by the driver is acquired,
wherein the reaction force is increased according to an increase in the steering angle in the nonlinear region,
wherein the lateral acceleration of the vehicle and turning torque for turning the tires are acquired,
wherein the rate of change between the increased amount of the lateral acceleration and the increased amount of the turning torque is calculated in a region where the relationship between the lateral acceleration and the turning torque becomes linear, and
wherein the nonlinear degree of the cornering force characteristic is calculated on the basis of the difference between a reference turning torque obtained by multiplying the rate of change by the lateral acceleration and the turning torque.

2. The steering control device according to claim 1,
wherein the speed of the vehicle is acquired to calculate a reference reaction force against the operation of the steering wheel by the driver on the basis of the speed and the steering angle,
wherein an additional reaction force against the operation of the steering wheel by the driver is calculated on the basis of the nonlinear degree, and
wherein the reaction force is calculated by adding the reference reaction force and the additional reaction force.

3. The steering control device according to claim 1,
wherein the speed of the vehicle is acquired, and
wherein in the case where the lateral acceleration is equal to or larger than a threshold value, the speed is equal to or larger than a threshold value, and the cornering force characteristic is in the linear region, the rate of the change is learned.

4. The steering control device according to claim 3,
wherein the rate of change is calculated by a sequential least squares method.

5. The steering control device according to claim 1,
wherein in the case where the difference between reference turning torque obtained by multiplying the rate of change by the lateral acceleration and the turning torque is equal to or smaller than a threshold value, it is determined to be in the linear region, and in the case where the difference exceeds the threshold value, it is determined to be in the nonlinear region.

6. The steering control device according to claim 1,
wherein in the case where the lateral acceleration increases and the turning torque changes from an increase to a decrease, a shift from the linear region to the nonlinear region is detected.

7. The steering control device according to claim 1,
wherein the steering torque of the steering wheel operated by the driver is acquired, and
wherein in the case where the steering torque is equal to or larger than a threshold value in the nonlinear region, the turning torque for turning the tires is increased.

8. The steering control device according to claim 7,
wherein in the case where the steering torque equal to or larger than the threshold value in the nonlinear region continues for a certain period of time, the reaction force is decreased.

9. The steering control device according to claim 7,
wherein the steering angle of the steering wheel operated by the driver and the turning angle of the tires are acquired,
wherein a reference turning torque is calculated on the basis of the relationship between the steering angle and the turning angle, and
wherein in the case where the steering torque is equal to or larger than the threshold value in the nonlinear region, additional turning torque corresponding to the magnitude of the steering torque is calculated, and a value obtained by adding the additional turning torque to the reference turning torque is output as the turning torque.

10. The steering control device according to claim 1,
wherein the steering angular speed of the steering wheel operated by the driver is acquired, and
wherein in the case where the steering angular speed exceeds a prescribed threshold value, the rate of increase of the reaction force is limited to a prescribed upper limit value.

11. The steering control device according to claim 1,
wherein in the case where the steering wheel and a turning mechanism for turning the tires are not mechanically connected to each other, the reaction force is generated.

* * * * *